US009179608B2

(12) United States Patent
Kempf

(10) Patent No.: US 9,179,608 B2
(45) Date of Patent: Nov. 10, 2015

(54) PLANT CONTAINER ASSEMBLY AND METHOD

(71) Applicant: Brian J. Kempf, Visalia, CA (US)

(72) Inventor: Brian J. Kempf, Visalia, CA (US)

(73) Assignee: Brian J. Kempf, Visalia, CA (US)

( * ) Notice: Subject to any disclaimer, the term of this patent is extended or adjusted under 35 U.S.C. 154(b) by 153 days.

(21) Appl. No.: 13/869,777

(22) Filed: Apr. 24, 2013

(65) Prior Publication Data

US 2013/0232871 A1    Sep. 12, 2013

Related U.S. Application Data

(63) Continuation-in-part of application No. 13/566,211, filed on Aug. 3, 2012, now Pat. No. 8,443,548, which is a continuation of application No. 12/463,122, filed on May 8, 2009, now Pat. No. 8,261,488.

(60) Provisional application No. 61/127,030, filed on May 9, 2008, provisional application No. 61/192,398, filed on Sep. 17, 2008.

(51) Int. Cl.
*A01G 9/10* (2006.01)
*A01G 9/02* (2006.01)
*A01G 23/04* (2006.01)

(52) U.S. Cl.
CPC ................ *A01G 9/10* (2013.01); *A01G 9/1073* (2013.01); *A01G 23/04* (2013.01)

(58) Field of Classification Search
CPC ............ A01G 9/01; A01G 9/10; A01G 9/12; A01G 9/02; A01G 9/1073
USPC ................ 47/66.3, 73, 78, 39, 65.5
See application file for complete search history.

(56) References Cited

U.S. PATENT DOCUMENTS 344,814 A  *  7/1886  Carsley .............................. 47/73
779,924 A  *  1/1905  Gommel ...................... 47/41.01

(Continued)

FOREIGN PATENT DOCUMENTS

FR             1377416       *  9/1963
WO       WO 93/03602          3/1993

OTHER PUBLICATIONS

International Search Report dated Nov. 13, 2009 from International Application No. PCT/US2009/043309.

(Continued)

*Primary Examiner* — Monica Williams
(74) *Attorney, Agent, or Firm* — Beyer Law Group LLP

(57) ABSTRACT

A bounding system for a transplantable plant including a bounding apparatus and a support tray. The bounding apparatus includes a sheet-like sidewall framework defining a plurality of elongated, spaced sidewall apertures, and a bottom support having a support surface area. The bottom support is includes a sheet-like bottom framework defining a plurality of spaced bottom wall apertures. The bounding system includes a support tray comprised of a relatively solid sheet material, and having a tray top portion and a surrounding sidewall. The tray top portion defines an opening therethrough that is formed and dimensioned for supportive receipt of the bounding apparatus therein such that the bottom support thereof is vertically oriented at least at a sufficient distance above the ground to promote and encourage air root pruning of the transplantable plant proximate the bottom support. The surrounding sidewall and the sidewall framework defines a humidifying airspace therebetween in a manner reducing rapid dry-down.

12 Claims, 33 Drawing Sheets

(56) References Cited

U.S. PATENT DOCUMENTS

| | | | |
|---|---|---|---|
| 1,689,017 A | 10/1928 | Fewkes | |
| 2,859,558 A * | 11/1958 | Hallum | 47/73 |
| 2,960,798 A | 11/1960 | Lindstaedt et al. | |
| 3,195,272 A | 7/1965 | Mosher et al. | |
| 3,825,126 A * | 7/1974 | Pohl et al. | 211/85.23 |
| 4,223,480 A | 9/1980 | Welty | |
| 4,497,132 A | 2/1985 | Whitcomb | |
| 4,510,712 A | 4/1985 | Whitcomb | |
| 4,574,522 A | 3/1986 | Reiger et al. | |
| 4,716,680 A | 1/1988 | Whitcomb | |
| 4,753,037 A | 6/1988 | Whitcomb | |
| D298,594 S * | 11/1988 | Hahn | D6/403 |
| 4,939,865 A | 7/1990 | Whitcomb et al. | |
| 5,054,235 A | 10/1991 | Pilz | |
| 5,099,607 A | 3/1992 | Lawton | |
| 5,241,784 A | 9/1993 | Henry | |
| 5,301,465 A | 4/1994 | Caferro | |
| 5,339,566 A | 8/1994 | Cormier | |
| 5,471,788 A * | 12/1995 | Willes | 47/75 |
| 5,557,886 A | 9/1996 | Whitcomb | |
| 5,768,825 A | 6/1998 | Reiger | |
| 5,937,577 A | 8/1999 | Butler et al. | |
| 6,044,585 A | 4/2000 | Carruth et al. | |
| D425,327 S * | 5/2000 | Levesque | D6/403 |
| 6,125,577 A * | 10/2000 | Merzweiler et al. | 47/39 |
| 6,173,531 B1 | 1/2001 | Howell | |
| 6,202,348 B1 | 3/2001 | Reiger | |
| 6,637,155 B1 | 10/2003 | Butler et al. | |
| 6,862,840 B1 | 3/2005 | Single | |
| 6,904,715 B1 | 6/2005 | Lawton | |
| 7,210,266 B2 | 5/2007 | Henry et al. | |
| 7,353,635 B2 * | 4/2008 | Westrate | 47/76 |
| 7,536,828 B2 * | 5/2009 | Slingerland et al. | 47/65 |
| 7,954,277 B2 * | 6/2011 | Cooley | 47/73 |
| 1,031,713 A1 | 7/2012 | Hills | |
| 8,261,488 B2 * | 9/2012 | Kempf | 47/78 |
| 8,443,548 B2 * | 5/2013 | Kempf | 47/73 |
| 2003/0029080 A1 | 2/2003 | Busby et al. | |
| 2003/0167688 A1 | 9/2003 | Atchley et al. | |
| 2004/0074142 A1 | 4/2004 | Busby et al. | |
| 2004/0200141 A1 | 10/2004 | Whitcomb | |
| 2004/0237389 A1 | 12/2004 | Whitcomb | |
| 2005/0034361 A1 | 2/2005 | Single | |
| 2005/0223639 A1 | 10/2005 | Whitcomb | |
| 2009/0241415 A1 | 10/2009 | Barghini | |
| 2009/0277084 A1 | 11/2009 | Kempf | |
| 2010/0236144 A1 | 9/2010 | Lawton | |
| 2013/0222871 A1 * | 8/2013 | Wardega | 358/505 |

OTHER PUBLICATIONS

Written Opinion dated Nov. 13, 2009 from International Application No. PCT/US2009/043309.

Partial International Search Report dated Aug. 24, 2009 from International Application No. PCT/US2009/043309.

European Search Report dated Mar. 30, 2012 from European Application No. 09 743 760.2-1260.

* cited by examiner

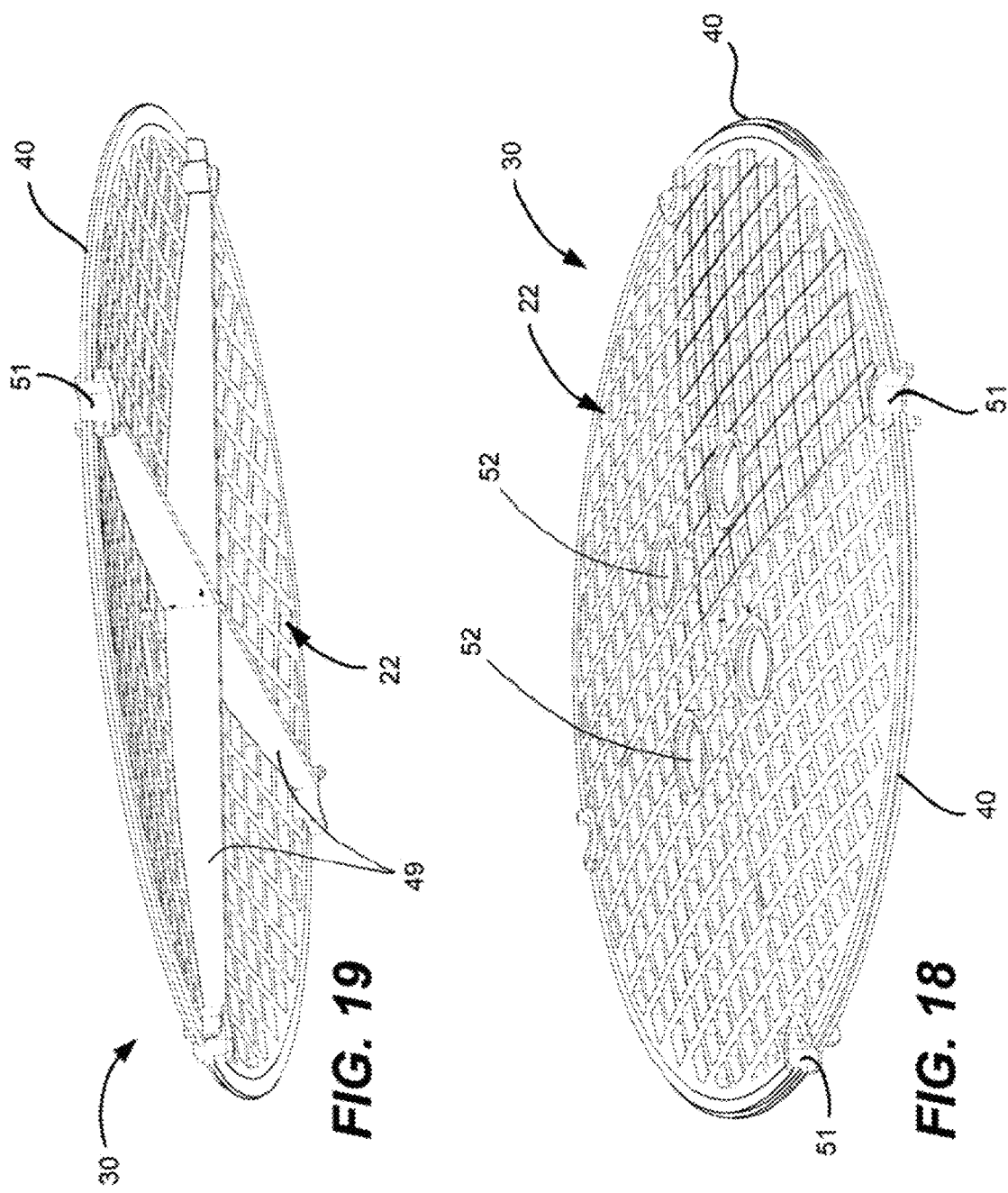

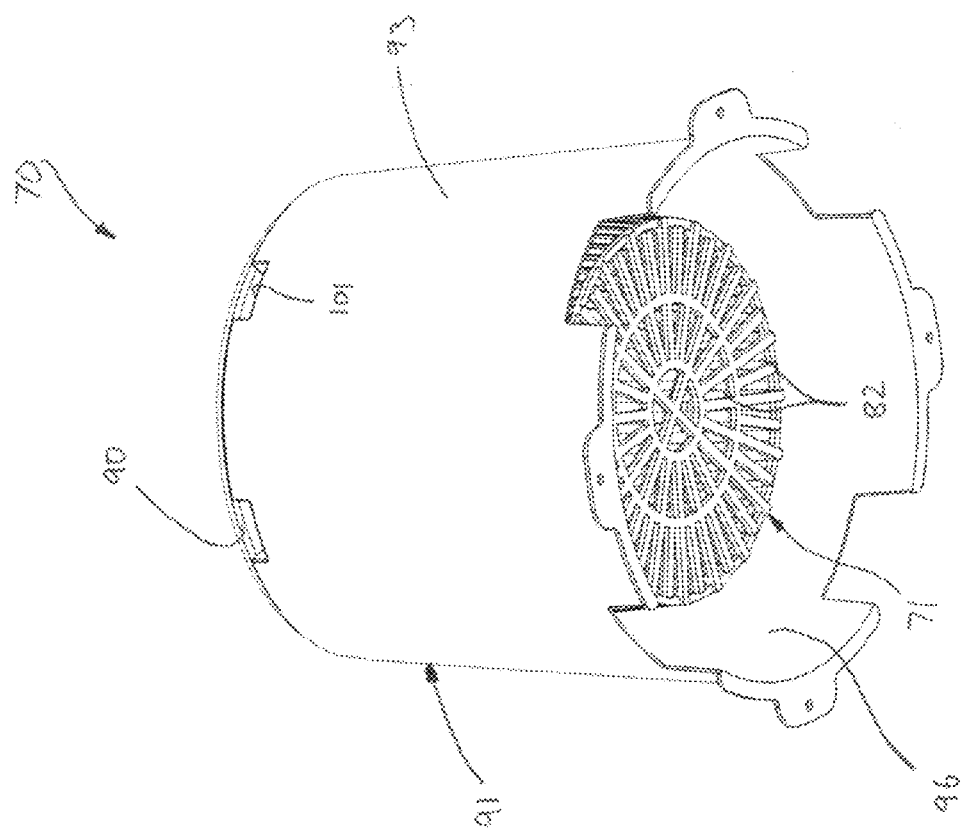
FIG._22
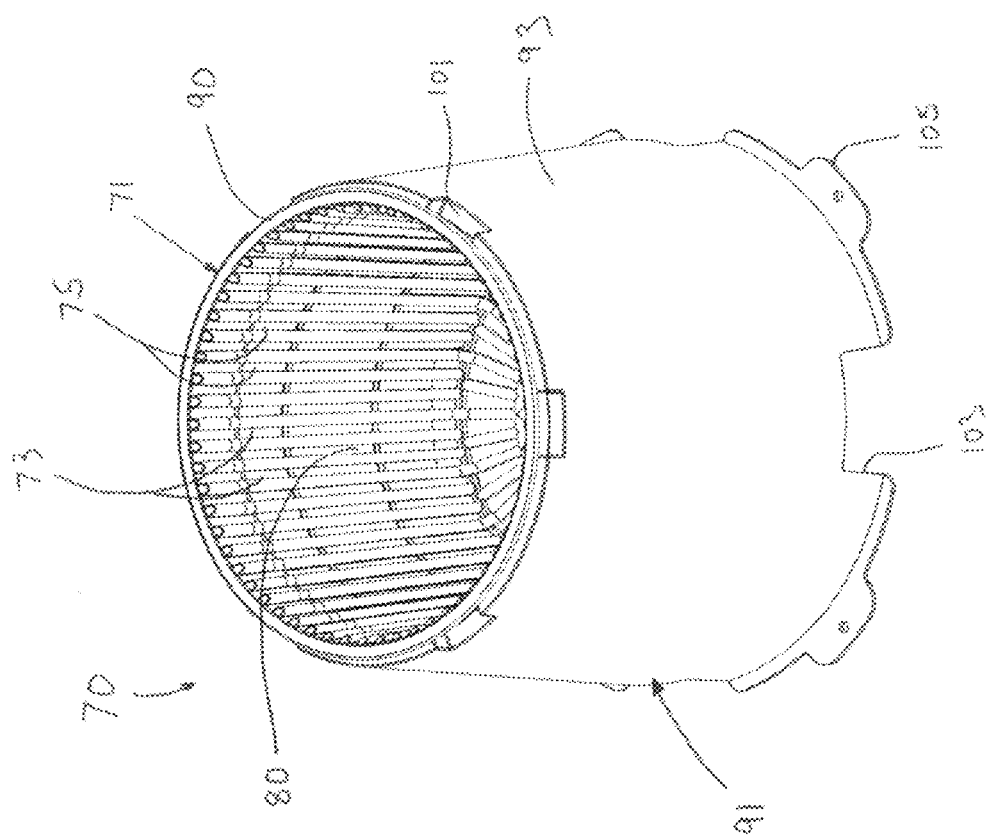
FIG._21

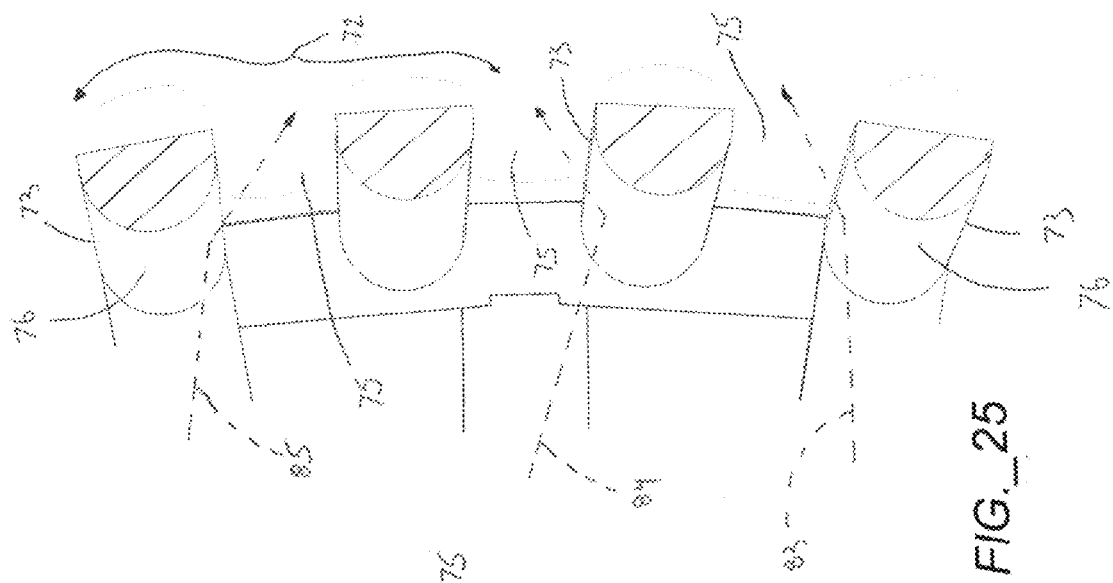
FIG._25
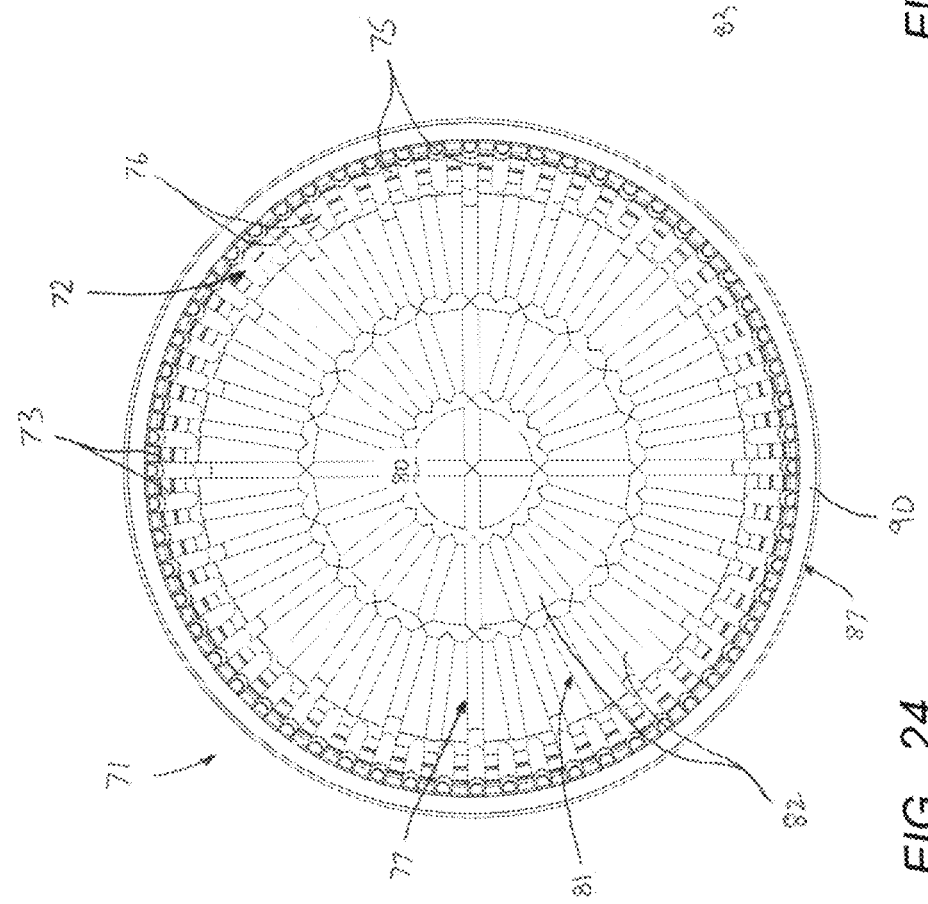
FIG._24

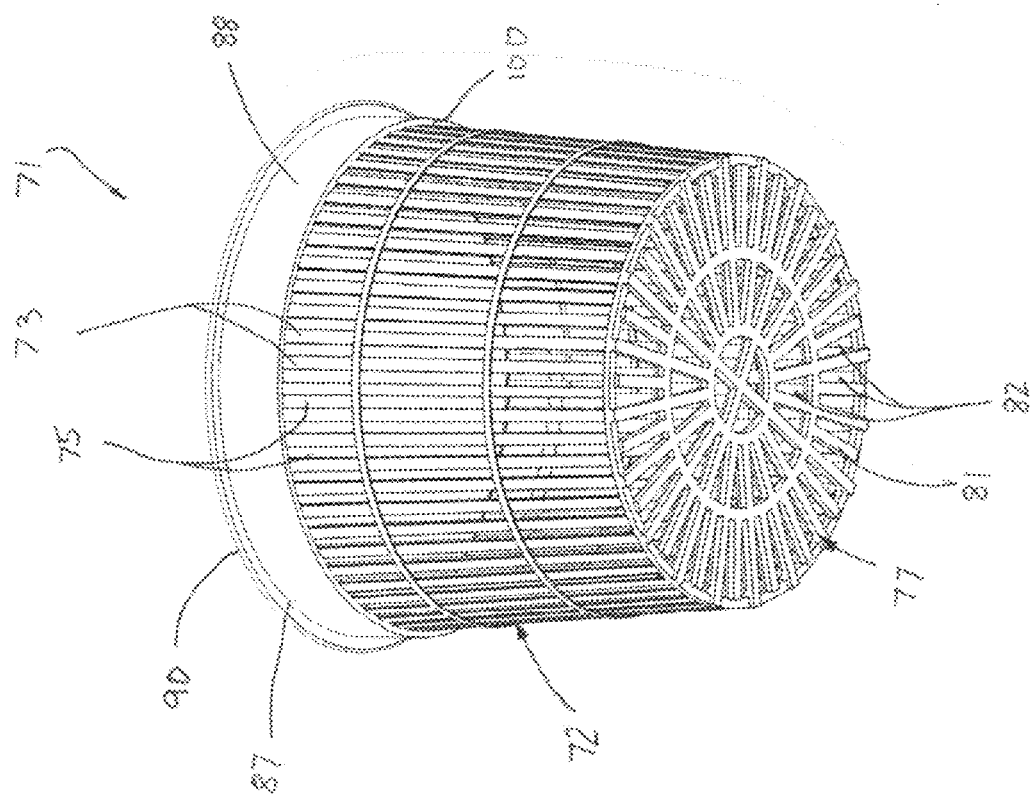
FIG._27
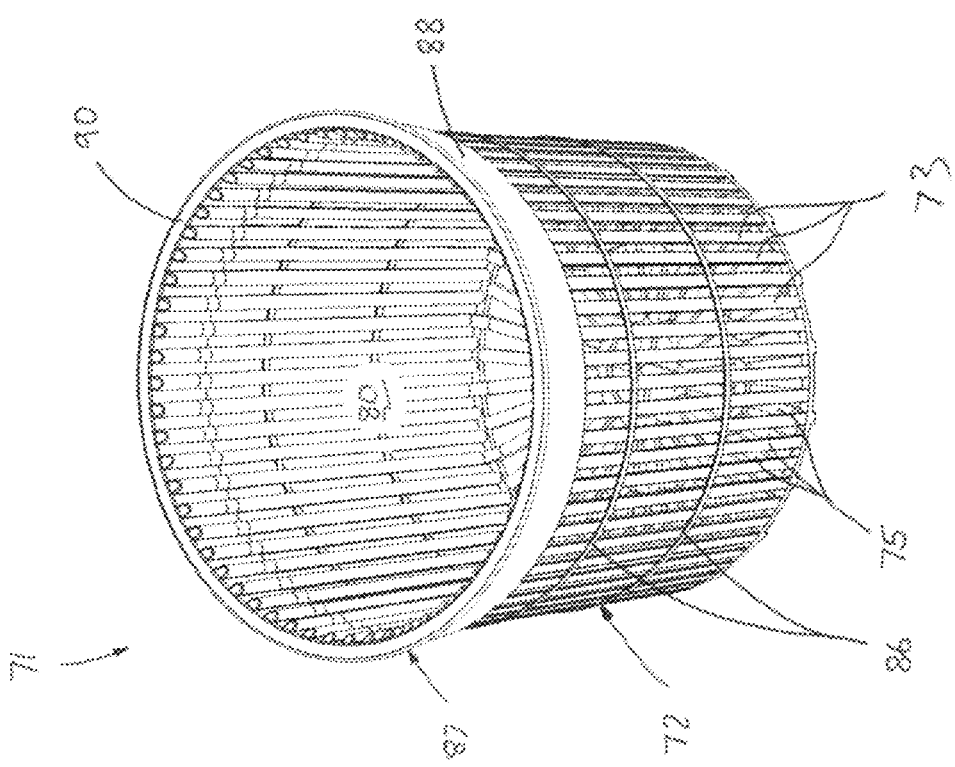
FIG._26

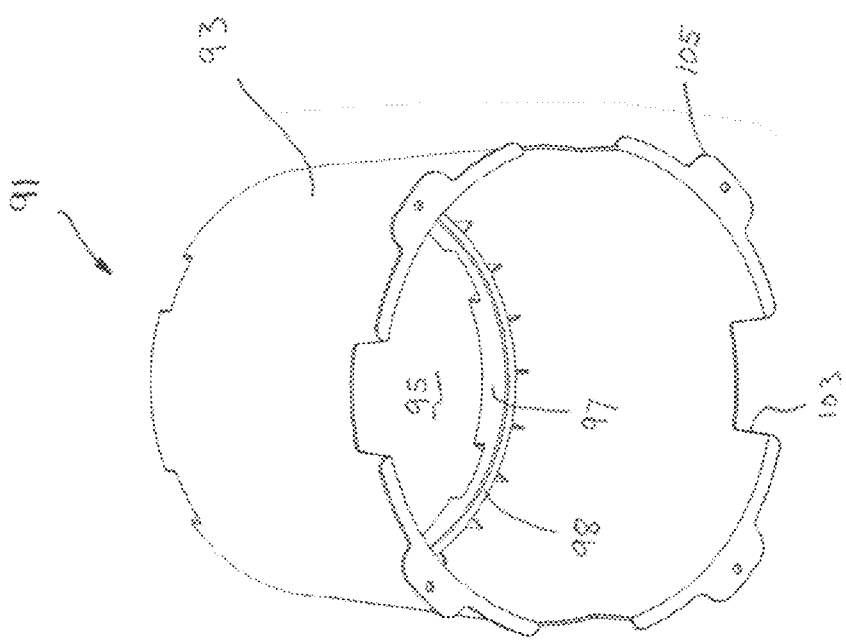
FIG._29
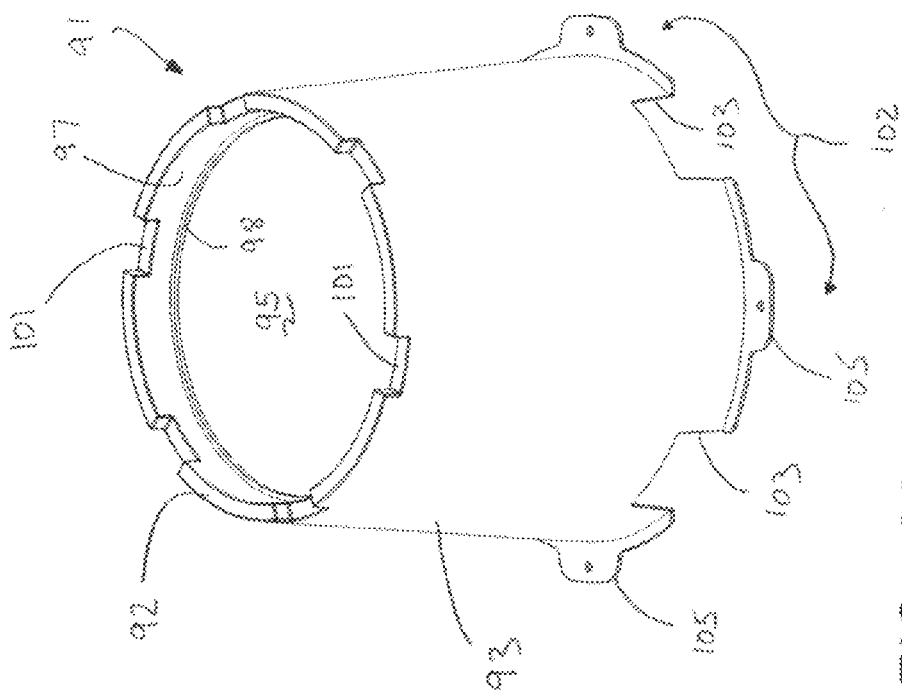
FIG._28

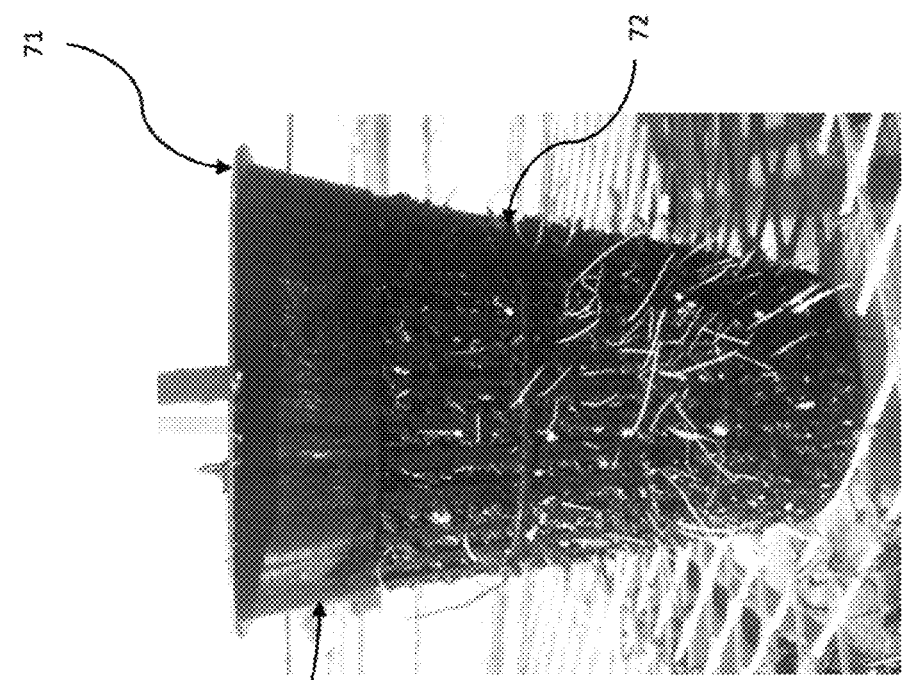
FIG._31
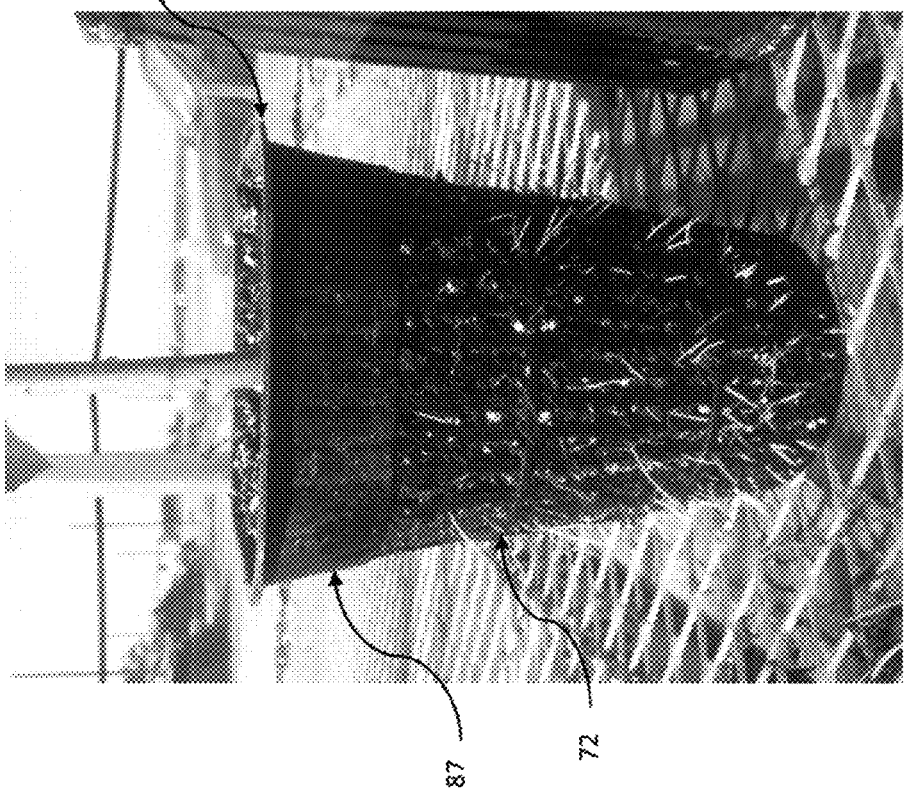
FIG._30

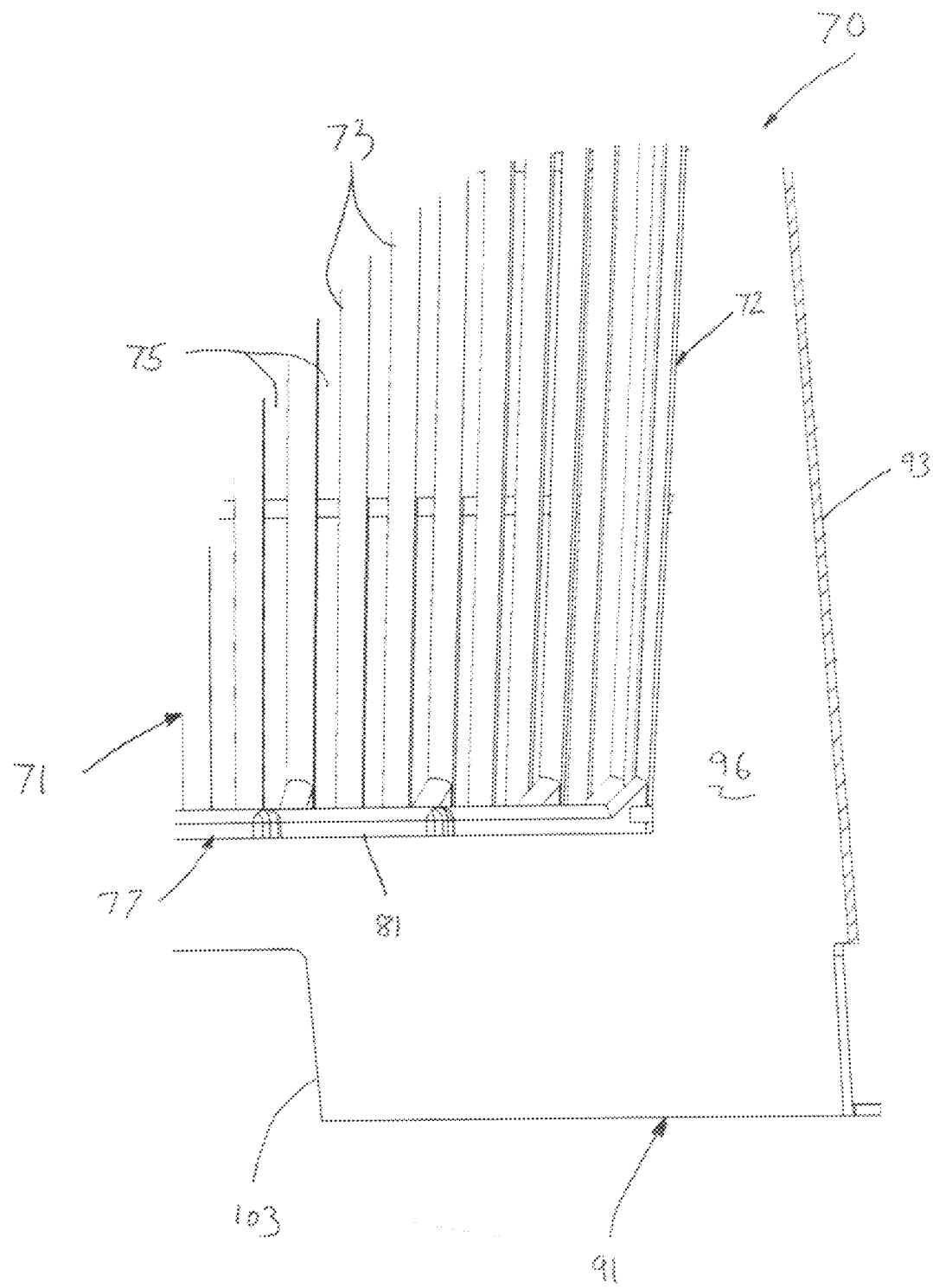
FIG._32

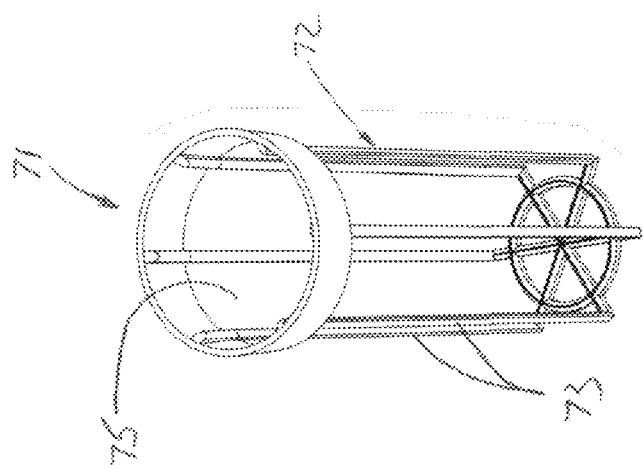
FIG._36
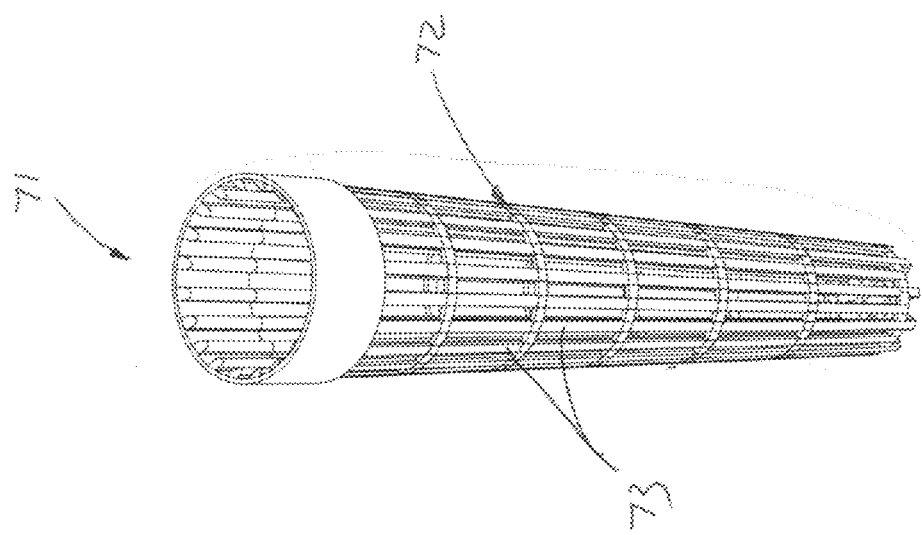
FIG._35
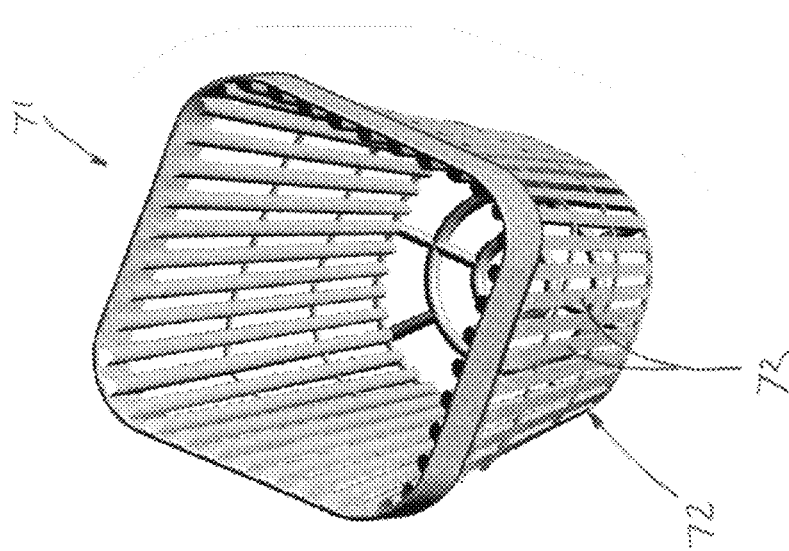
FIG._34

PLANT CONTAINER ASSEMBLY AND METHOD

RELATED APPLICATIONS

This application is a Continuation-In-Part of U.S. patent application Ser. No. 13/566,211, now U.S. Pat. No. 8,443,548, filed Aug. 3, 2012, which in turn is a Continuation of U.S. patent application Ser. No. 12/463,122 (now U.S. Pat. No. 8,261,488), filed May 8, 2009, both entitled "PLANT CONTAINER ASSEMBLY AND METHOD, and both naming Kempf as the inventor; which further claims priority under 35 U.S.C. §119(e) from U.S. Provisional Patent Application No. 61/127,030, filed May 9, 2008, and further claims priority from U.S. Provisional Patent Application No. 61/192,398, filed Sep. 17, 2008, both entitled "PLANT CONTAINER", and naming Kempf as the inventor; all of which are incorporated herein by reference in their entirety and for all purposes.

FIELD OF THE INVENTION

The present invention relates generally to containers for growing woody perennial plants. More particularly, the present invention relates to a container base designed to encourage air root pruning on the outside of the container sidewall in order to develop a fibrous root system, prevent stem girdling, and prevent circling and/or root defects from developing at the container sidewall and/or bottom.

BACKGROUND OF THE INVENTION

Currently, the majority of the nursery grown landscape plants, such as trees and shrubs, are initially grown in conventional smooth-wall, non-porous containers made of plastic, steel or other materials. The smooth-wall containers, however, tend to deflect root growth, causing it to then follow along the interior surface of the container, or deflect the root around the sidewall creating a root defect. This often results in root circling and a stem girdling root system. Such containers cause the primary roots to revolve around the container, which can cause significant stability problems when the tree matures. Such poor root development and anchorage problems are especially detrimental to trees of the larger variety.

Generally, the roots of a plant grow and extend in a radial fashion from the main stem or trunk. Thus, a root will extend in a naturally promoted direction (i.e., outwardly and downwardly) until it contacts something that it cannot move or penetrate. At that point, the root is deflected in a new direction and extends until it encounters something else that would change its direction of growth or travel. Many seedling woody perennials, in particular, will first develop a tap root that plunges downward. The tap root on some woody perennials will develop a foot of primary root for every inch of top growth. Once the taproot is cut or pruned, the apical dominance of its root tip is lost and the development of some secondary lateral rooting commences. These secondary roots tend to grow a little more horizontally, although generally downwardly, in direction. When these roots run out of room to grow, they begin to circle around the inside of the container. Hence, unless air root pruning is permitted, a phenomenon in which the growth of a root ceases when the root extends into the vicinity of an aperture that is exposed to the atmosphere, these roots will grow to the bottom of the container where they continue to grow in a circular pattern.

Air pruning, hence, is highly desirable, and naturally occurs when roots are exposed to air in the absence of high humidity. The roots are effectively "burned" off, causing the plant to continually produce new and healthy branching roots. If roots are not exposed to air, they continue to grow around the container in a constricted pattern. The roots may spiral, twist, kink or become stem girdling. When such a plant is later installed into the landscape, it will likely fail to establish a normal root structure, and instead will have reduced uptake of water and nutrients. Eventually abnormal growth should be obvious and could cause the plant to fail. Damaged root systems also cause leaves to turn yellow or brown, shrivel or drop. Healthy, highly branched root structures allow a plant to more efficiently uptake water and nutrients while increasing growth and overall plant health. A strong, fibrous radially extending root system will make a plant better able to establish itself when installed in a planting project.

Many plant containers have been developed that attempt to encourage side root growth, via air root pruning, and reduce circling of the roots. For instance, many cylindrical plant containers exist that incorporate small size side apertures in an attempt to inhibit such concentrated spiral and circular root growth. In all these designs, however, the side apertures are relatively small, and are not sufficiently abundant. This is due to the fact that too large and too many apertures will not retain the soil properly, allows the water to pass through the sides too quickly, not allowing the soil to absorb moisture, and accelerates evaporation. Although the mere presence of a side aperture or apertures do function to encourage side root growth, air-pruning of the roots, and initially reduce the incidence of spiraled or circled roots, eventually the small sidewall apertures become filled with roots or the secondary roots the encounter sidewall and deflect, causing spiraling and circling to ensue. The large amounts of obstructive material greatly increase the opportunity for the development of circling and stem girdling roots. Once the apertures have become filled with roots, the opportunity for air pruning is diminished and root circling begins. Typical of such designs are disclosed in U.S. Pat. Nos. 4,442,628; 4,497,132; 4,510,712; 4,753,037; 4,939,865; 5,099,607; 5,131,185; 5,241,784; 5,557,886; and 5,937,577.

Accordingly, it is therefore highly desirable to provide a transplantable plant container that encourages regenerative root growth though the container sidewall, even after air pruning has commenced, until the plant is transplanted or planted into the landscape.

It is further desirable to provide an improved plant container for growing transplantable plants, whereby spiral and circular root growth is reduced or substantially prevented, and the development of lateral root tips at the bottom and around the sides of the container is maximized by air root pruning.

It is still further desirable to provide a plant container that is formed to improved plant growth wherein the production of lateral root tips is promoted at all levels in a plant growth medium and the root tips quickly grow in all natural directions radially from the plants main stem, whereby the plant is quickly laterally anchored when transplanted and maximum water and nutrients are absorbed.

Despite the abundance of container designs available that improve the health of a transplantable plant, there remains a need for a container that enhances root development by air pruning of the roots and significantly prevents circling and stems girding roots.

SUMMARY OF THE INVENTION

The present invention provides a bounding system for a transplantable plant for bounding a growing medium in which the transplantable plant is grown. Therefore, root regeneration is vastly improved. The bounding system includes a bounding apparatus having a sheet-like lattice framework, which is comprised of a plurality of elongated rib members, spaced apart from one another. Each elongated rib member defines an interior facing surface that is convex-shaped in a transverse cross-sectional dimension thereof. Further, each adjacent elongated rib member defines an elongated, spaced sidewall apertures therebetween, and hence a plurality of sidewall aperture that collectively define a sidewall aperture area. This sidewall aperture area comprises at least about 50% of the sidewall surface area. The bounding apparatus further includes s bottom support having a support surface area. The bottom support and the sidewall framework cooperate to define a cavity formed for receipt of the growing medium therein. The bottom support further include a sheet-like bottom framework having a plurality of spaced bottom wall apertures which promote and encourage air root pruning of the transplantable plant proximate the bottom support when vertically oriented at a location above the ground by a sufficient distance.

Accordingly, the convex interior profile of the interior facing surface of each elongated rib members (regardless of their orientation) facilitates any root growth contacting these surfaces to be deflected into and through the respective adjacent sidewall apertures. Unlike the current designs were the interior wall are relatively flat, any such root growth directly contacting such a surface will not be directed back inward toward into the container.

In one specific embodiment, the rib members and the sidewall apertures are generally vertically oriented. The rib members are relatively uniformly spaced about a longitudinal axis of the sidewall framework.

In another specific configuration, the sidewall aperture area comprises at least about 60% to about 95% of the sidewall surface area. The bottom wall apertures are relatively uniformly spaced about the longitudinal axis, and collectively define a bottom wall aperture area that comprises at least about 60% to about 95% of the support surface area.

In still another embodiment, the sufficient distance is in the generally in the range of about one inch to about six inches, and could be as little as ⅛ inch for smaller containers.

In another aspect of the present invention, a bounding system for a transplantable plant is provided for bounding a growing medium in which the transplantable plant is grown. The bounding system includes a bounding apparatus having a sheet-like sidewall framework and a bottom support, which cooperates to define a cavity, formed for receipt of the growing medium therein. The sidewall framework, having a sidewall surface area, defines a plurality of elongated, spaced sidewall apertures therebetween that collectively define a sidewall aperture area. The sidewall aperture area comprises at least about 50% of the sidewall surface area. The bottom support includes a sheet-like bottom framework having a support surface area, and defines a plurality of spaced bottom wall apertures. The bottom and bottom wall apertures are adapted to promote and encourage air root pruning of the transplantable plant proximate the bottom support when vertically oriented at a location above the ground by a sufficient distance. In accordance with the present invention, the bounding system further includes a support tray, which is comprised of a relatively solid sheet material. The support tray includes a tray top portion and a surrounding sidewall. The tray top portion supportively accommodates the bounding apparatus such that the bottom support thereof is vertically oriented at least at the sufficient distance above the ground. The surrounding sidewall and the sidewall framework define a humidifying airspace therebetween in a manner reducing rapid dry-down.

Accordingly, the support tray significantly reduces, if not eliminates, sun exposure of the exposed growing media contained at the sidewall apertures and the bottom support wall apertures significantly reducing rapid dry-down of the exposed growing media. Moreover, the air movement of the immediately surrounding the sheet-like sidewall framework is also significantly reduced, essentially creating a dead airspace (i.e., the humidifying airspace therebetween). In effect, the significant reduction of the rapid dry down, as well as the significant reduction of air movement, in this dead airspace creates a surrounding high humidity area, which further promotes air root pruning.

In one specific embodiment of the present invention, the support tray includes a regulating system that cooperates with the surrounding sidewall to regulate the humidity in the humidifying airspace.

In another configuration, the bounding apparatus is removably mounted to the support tray, and includes a collar member at an upper portion of the sidewall framework. The tray top portion of the support tray defines an opening therethrough for sliding axial receipt of the sidewall framework until the collar member is supportively seated atop tray top portion.

In yet another specific embodiment, the bounding apparatus is integrally formed with the support tray.

In another embodiment, the bounding system includes two or more bounding apparatus, and the tray top portion is configured to supportively accommodate each of the two or more bounding apparatus.

BRIEF DESCRIPTION OF THE DRAWINGS

The assembly of the present invention has other objects and features of advantage which will be more readily apparent from the following description of the best mode of carrying out the invention and the appended claims, when taken in conjunction with the accompanying drawings, in which:

FIG. 18 is an enlarged, top perspective view of a bottom portion of the multi-piece sidewall container assembly of FIG. 9.

FIG. 19 is a bottom perspective view of the bottom portion of FIG. 18.

FIG. 21 is a top perspective view of an alternative embodiment boundary system constructed in accordance with the present invention.

FIG. 22 is a bottom perspective view of the boundary system of FIG. 21.

FIG. 24 is an enlarged top plan view of the boundary apparatus of FIG. 23.

FIG. 25 is a fragmentary, enlarged, top plan view, in partial cross-section, of the sidewall framework of the boundary apparatus of FIG. 23.

FIG. 26 is a top perspective view of the boundary apparatus of FIG. 23.

FIG. 27 is a bottom perspective view of the boundary apparatus of FIG. 23.

FIG. 28 is a top perspective view of the support tray of FIG. 23.

FIG. 29 is a bottom perspective view of the support tray of FIG. 23.

FIGS. 30 and 31 are photographs of a boundary apparatus of the boundary system of FIG. 23, showing the root growth into the dead air space when using the boundary system in accordance with the present invention.

FIG. 32 is a fragmentary, enlarged, side elevation view, in cross-section, of a lower portion of the boundary system of FIG. 23.

FIGS. 34-36 are top perspective views of alternative embodiment boundary apparatus constructed in accordance with the present invention.

DETAILED DESCRIPTION OF THE INVENTION

Figure 2:
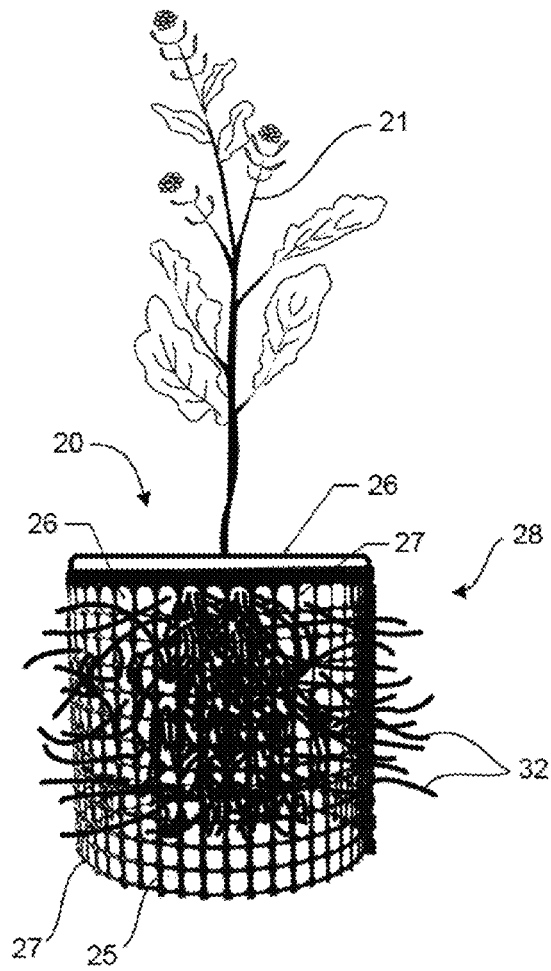
FIG. 2 is a reduced side elevation of the container assembly of FIG. 1 with a plant with its air pruned roots penetrating the absorbent liner material in accordance with the present invention.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Referring now to FIGS. 1-4, a bounding apparatus, generally designated 20, is illustrated, for bounding a growing medium in which a transplantable plant 21 is grown. The bounding apparatus 20 includes a sheet-like lattice framework 22 defining a plurality of spaced apertures 23 extending through the lattice framework from an interior wall 24 to an exterior wall 25 thereof. The bounding apparatus 20 further includes a relatively thin, moisture absorbent liner material 26 disposed juxtaposed or adjacent (i.e., one in front of the other) to the said lattice framework 22. As will be described in greater detail below, in accordance with the present invention, it is generally the combination of the lattice framework with the high density of apertures and the moisture absorbent liner material 26 that has been found to significantly promote air root pruning, and thus side root regeneration.

Figure 3:
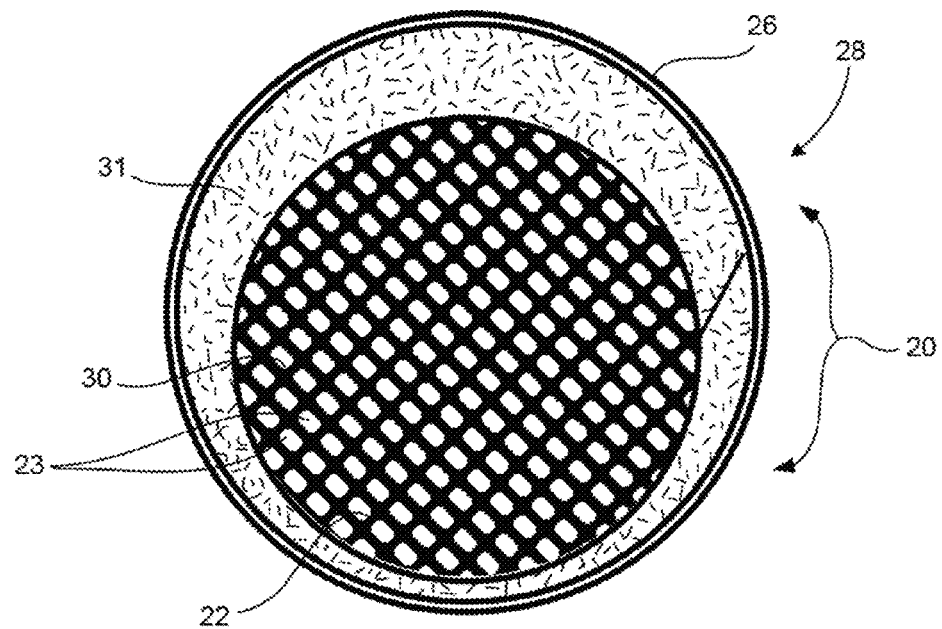
FIG. 3 is a top perspective view of the container assembly of FIG. 1.
Figure 4:
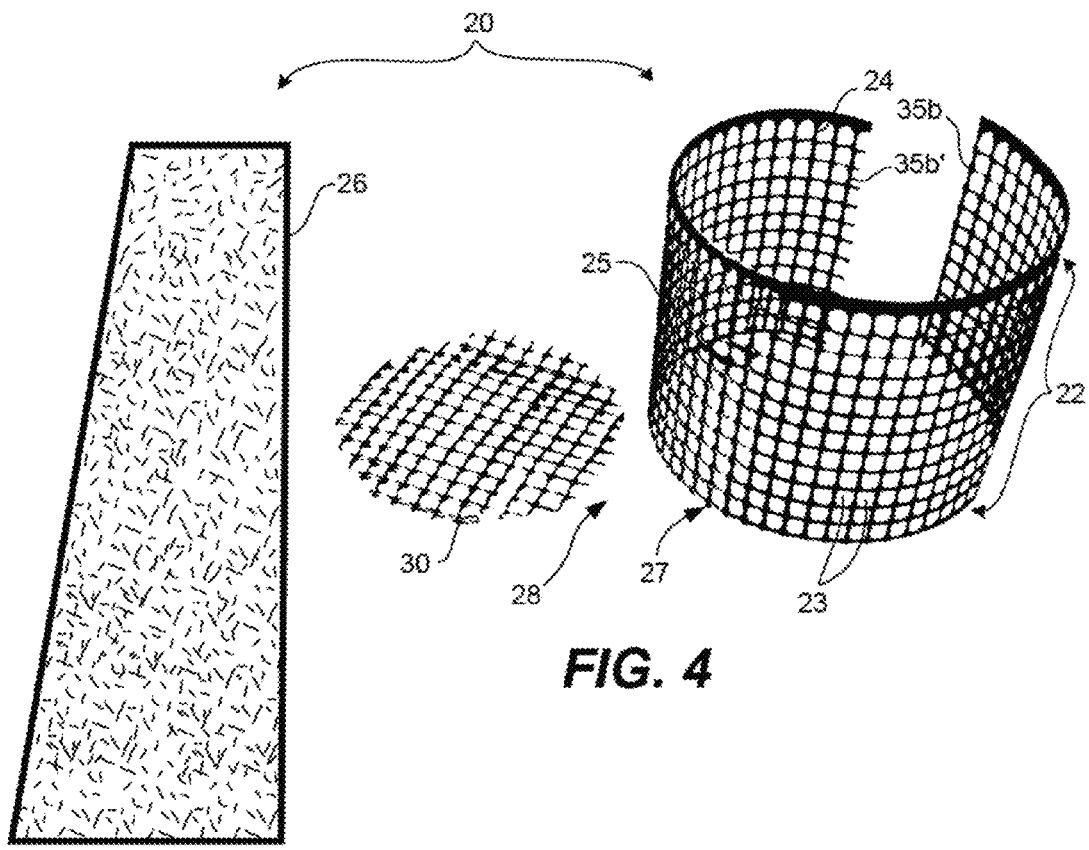
FIG. 4 is a top perspective view of the container assembly of FIG. 1, broken into parts.

More preferably, the bounding apparatus 20 is incorporated into a peripheral sidewall support 27 of a transplantable plant container device 28. The peripheral sidewall support 27, thus, is similarly comprised of a lattice framework 22 that extends all the way around to form the sidewall of the container device. FIGS. 3 and 4 best illustrated that an interior wall 24 of sidewall support 27, together with an interior wall 24 of a bottom support 30, collectively define an interior cavity 31 of the container device which supports the growing medium therein.

Figure 1:
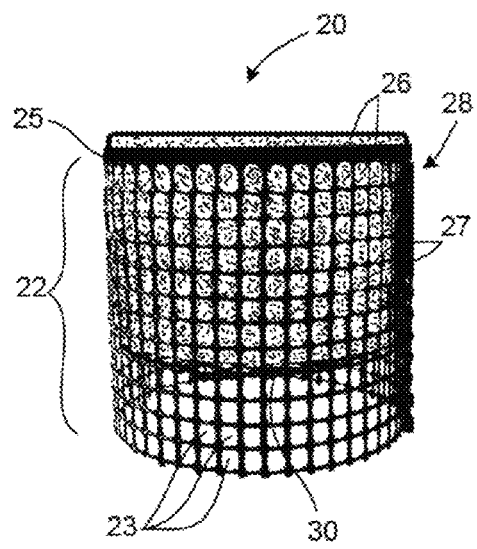
FIG. 1 is a side perspective view of a bounding apparatus and container assembly constructed in accordance with the present invention.

As shown in FIGS. 1 and 3, the absorbent liner material 26 is preferably positioned adjacent and juxtaposed to the interior wall 24. Therefore, when growing medium (preferably moist soil, although the medium could include, but is not limited to soil, bark, sand and peat) is contained against the absorbent liner material 26, in the container interior cavity 31, the liner material 26 is peripherally supported by the lattice framework 22. The absorbent liner material 26, thus, will not have to provide full lateral support for the heavy, moist growing medium (especially detrimental with larger containers), and can rely upon the lattice framework 22 to provide lateral structural integrity. It will be appreciated, however, that for air pruning purposes, the absorbent liner could be disposed adjacent and juxtaposed to the outer exterior wall 25 of the lattice framework as well.

In accordance with the present invention, as mentioned, the moisture absorbent liner material 26 itself functions to retain the growing medium within the container device 28 together with the porous lattice framework 22, especially given the relatively large, as well as high density of apertures 23, in the container sidewall. Thus, the liner material 26 must be composed of a material having sufficient structural integrity, when moist, to bind the moist growing medium within the interior cavity 31, across the spaced apertures 23 in the lattice framework 22. This liner quality, however, is much easier to accommodate across the liner due to the additional lateral support provided framework around each aperture 23

The absorbent liner material 26, moreover, must also be sufficiently absorbent to retain moisture about the container periphery. This encourages regenerative root growth outwardly from the plant 21 toward and out of the container sidewalls, via the relatively large diameter apertures (i.e., air root pruning, as will be described). The absorbent liner material 26, therefore, must further be sufficiently penetrable, by the root, to enable root penetration through the liner, at the apertures of the lattice framework 22 (FIG. 2).

Once these roots penetrate the liner material, at the container apertures 23, their root tips are exposed to relatively dry air, and are subsequently desiccated or killed. As these exposed root tips are air pruned, they lose their dominance, allowing many secondary roots develop to replace the desiccated tips. This regenerative cycle of air pruning occurs over and over, as even more roots are replaced if permissible, through the relatively large diameter apertures 23 of the sidewall support 27.

Accordingly, as indicated, the moisture absorbent liner material 26 not only retains the soil in the interior cavity 31 of the container device when the root growth is not mature, but also retains moisture at the periphery of the sidewall. This moisture encourages root growth through the abundant apertures 23 of the lateral support providing sidewall support 27, where the root tips penetrate the absorbent liner material. Once the root tips of these roots are exposed to air, they become air pruned, causing the cycle to commence all over again. The present inventive container device, thus, facilitates training of the root system with a very large quantity of young vigorous roots that extend outwardly and downwardly through growth media. This allows for continual growth and penetration of new root tips to and through the air-root pruning apertures and liner material, while significantly preventing stem girding and circling roots. Further, the present invention affords the opportunity for root tips to continue developing, and to air root prune due to the large size (relative to the roots) of the sidewall apertures 23. Combined with the moisture absorbent liner material 26, the regeneration and continuous penetration of new roots are encouraged through sidewall apertures.

Examples of such suitable absorbent liner materials include, but are not limited to various papers, cellulose or other fiber materials with a mixture of polyester or other reinforcing materials. Such liner materials, as mentioned, must have sufficient structural integrity to provide reinforcement across the apertures 23 of the sidewalls, while dampen, to retain the soil median and moisture within the container device. The liner, on the other end, must be sufficiently forgiving or penetrable, to enable the roots 32 to penetrate the liner and extend through the apertures of the container device, in a manner encouraging air root pruning. Another required quality of the liner material 26 is that must be sufficiently absorbent to retain moisture therein. This property, as mentioned, encourages root growth toward, as well as root penetration though, the liner for air pruning. Depending upon the composition of the material, the liner thickness can range from about as thin as a conventional letter sized paper (paper) to about ¼ inch thick (cellulose). Thinner liners enable an increased volume of growing medium in the interior cavity, but must provided the requisite sufficient moisture absorbent quality, as well as provide sufficient structural integrity across each framework aperture 23. The liner material 26 is also preferably biodegradable so that it may remain on the root ball when shifted when transplanted into at larger container size or landscape. One particularly acceptable liner material 26, for example, is Ellegaard Paper provided by Ellegaard of Denmark (www.ellepot.dk).

Figure 5:
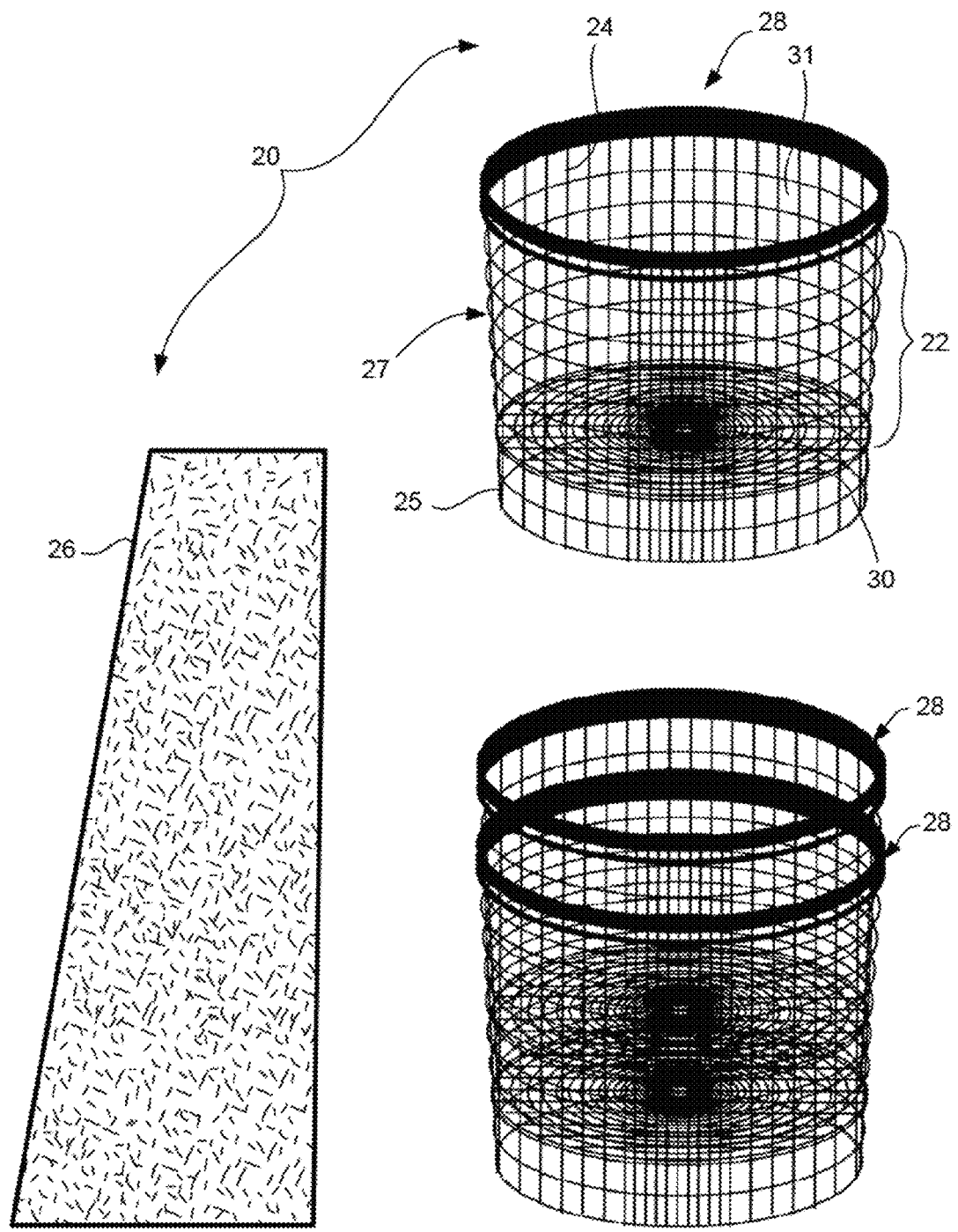
FIG. 5 is a top perspective view of a wire mesh alternative embodiment to the container assembly of FIG. 1, showing stacked nesting of thereof.

Referring now to FIGS. 4 and 5, the container device 28 is shown having the sidewall support 27 with a plurality of relatively large side apertures 23 of a relatively high density. In fact, both the sidewall support 27 and the bottom support 30 (as will be described); define apertures 23 over substantially their entire surface areas thereof.

It is also desirable to select an aperture diameter and/or aperture density that is a sufficiently large so as not to permit the roots to fill and/or clog of the apertures 23. Such clogging of the sidewall apertures, as well as insufficient moisture around the sidewall periphery, will not encourage regenerative root growth through the absorbent liner and apertures. The size of the apertures 23, in one specific embodiment, should be selected to be at least larger than the anticipated diameter of the roots that circle the container sidewall at the anticipated time of transplant.

The greater the aperture density, the smaller the overall aperture diameter can be. In contrast, the lesser the aperture density, the larger the aperture diameter should be. The porosity, however, should be substantially uniformly distributed over the sidewall support surface area, as bunching of the actual wall area may cause root girdling and not provide an avenue for the root tips to penetrate the liner material. As a very general rule, the average width or diameter of the apertures 23 (since apertures of varying width may be employed) is greater than the average distance of the sidewall material between adjacent apertures (i.e., the average aperture spacings).

In one specific embodiment, given the total surface area of the interior wall 24 of the sidewall support (which incidentally should be similar to the outer exterior wall 25), the total collective area of the through apertures 23 is in the range of at least about 60% of the total interior wall surface area. More preferably, this percentage is in the range of at least about 80%, and most preferably, the total aperture surface area is in the range of at least about 95% of the total interior wall surface area.

As shown in FIGS. 1 and 5, in one configuration, the sidewall support 11 is comprised of a course mesh-type lattice framework 22 having relatively square, rectangular or rhombus shaped apertures that maximize the aperture size, as well as density. In this particular embodiment, by way of example, the mesh material has a width in the range of about ⅛ inch to about ¼ inch thick, while the apertures 23 have a width in the range of about ¼ inch to about 1.0 inch. It will be appreciated, of course, that other dimension material widths and apertures are acceptable. Moreover, it will be appreciated that while a lattice-type structure typically refers to rhombus or diamond shaped holes, in the meaning of the present invention, the apertures can be any reoccurring shape, and particularly that mentioned above, as well as a circle or oval, or any combination of shapes listed above.

In another specific embodiment, the material of the sidewall support 27 of the container device 10 may be composed of a flexible plastic material, a metallic wire material, and/or a biodegradable material, or the like that is adapted to be easily manually configured generally in a cylindrical-shell of frustoconical-shell shape. Alternatively, the container device 28 could be formed of aluminum or another suitable metal, or of other materials such as a papier-mâché with some fiberglass or other fibers added to provide strength and durability.

The container devices 28 may be manufactured in various ways. For example, the container device may be hot-pressed or injection-molded into one complete piece. Alternatively, as will be described below, the container device may be manufactured in multiple pieces that enable substantially flat, unassembled, storage of the container for easy shipping and assembly thereof.

Although the general shape of the sidewall support 27 of the container device 28 is illustrated as substantially cylindrical shaped, as indicated, the sidewalls may taper inwardly from the top portion toward the bottom support thereof, format a frustum. As shown in FIG. 5, such taper enables nesting and stacking of the container devices for shipping and storage.

Referring now to FIGS. 3 and 4, the container bottom support 30 is preferably circular, and itself may incorporate a sheet-like lattice framework 22 having a plurality of apertures, similar to that of the sidewall support 27. Moreover, the container bottom support 30 is configured to raise the bottom support 30 a sufficient distance above the ground so as to permit room underneath the container device for the roots to air root prune, and to further avoid perched water (FIGS. 1 and 5. For example, the bottom support 30 of the container device 28 may be displaced in the range of about one inch to about six inches above the ground (i.e., the point at which the container device contacts on the ground.

Figure 6:
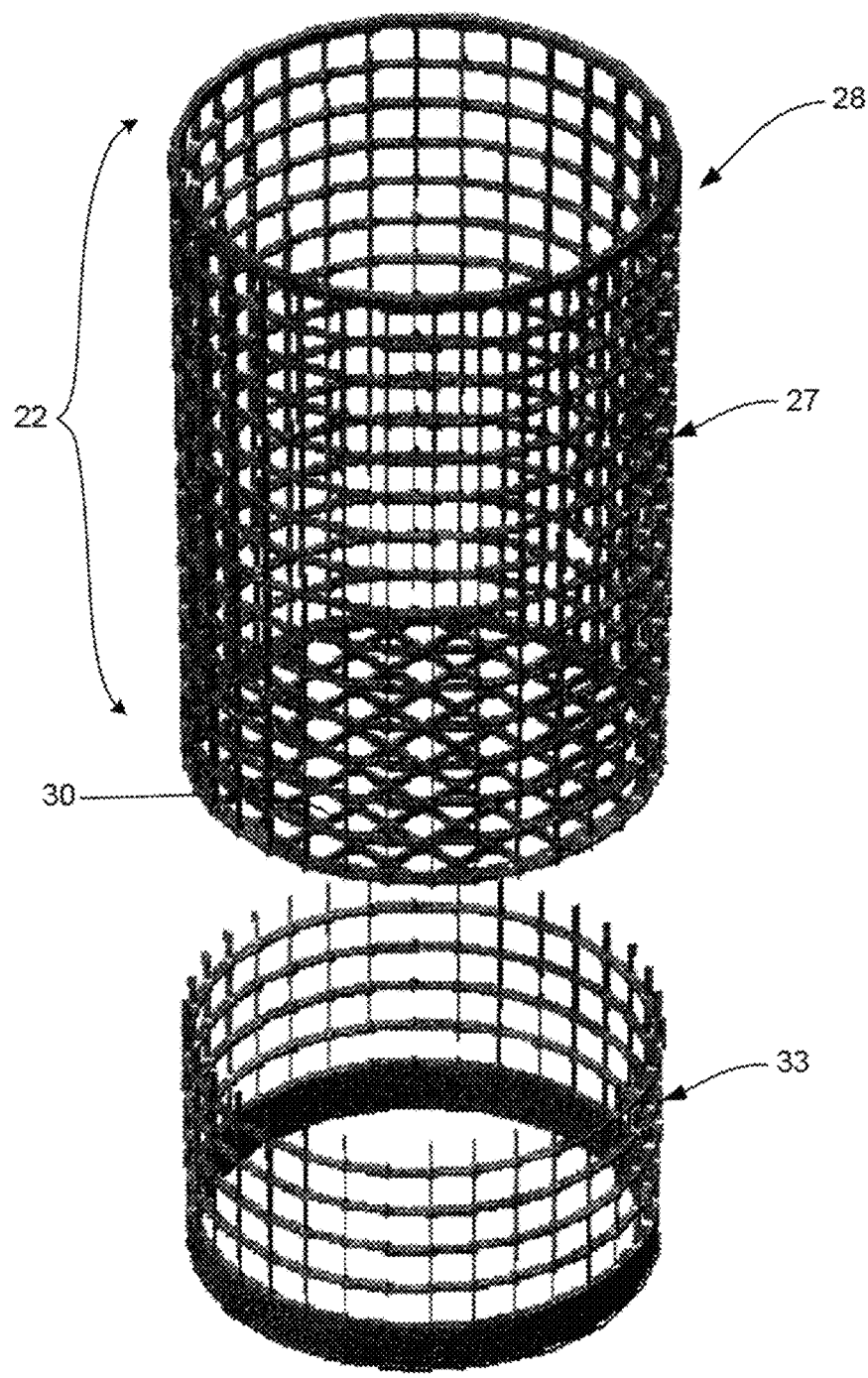
FIG. 6 is an enlarged top perspective view of the container assembly of FIG. 1, having a detachable pedestal.

Since the bottom support 30 is detachable mounted to the sidewall support 27, in the embodiments of FIGS. 1-4, the bottom surface can be vertically elevated anywhere therealong. In another specific embodiment, as shown in FIG. 6 the container device may include a detachable pedestal 33 that mounts to the bottom of the container device 28, and thus, elevates the bottom support above the ground.

Moreover, the lattice framework 22 of the bottom support 30 may also include a respective circular absorbent liner material (not shown) disposed adjacent, and juxtaposed, to the framework. This liner material exhibits the same qualities and properties as that of the sidewall liner material. This combination (i.e., high density of apertures 23 of the bottom lattice framework 22 and the absorbent liner material) similarly promotes significant air root pruning, and thus bottom root regeneration.

In another aspect of the present invention, referring now to FIGS. 7 and 8, the container device 28 is assembled from a substantially planar sidewall support 27 (although the embodiment depicted actually incorporates a multi-piece design, as will be described below) and an independent bottom support 30. This configuration simplifies bulk transportation of the components due to the substantially flat nature of the sidewall support and the bottom support. Assembly of the components, however, is required.

In this configuration, both the sidewall support 27 and the bottom support 30 of the container device 28 are more structurally robust than that of the wire mesh embodiments shown in FIGS. 1-5. However, the sidewall support 27 must also be sufficiently flexible to resiliently bow from a natural, substantially planar, non-assembled condition (FIGS. 7 and 8) to a bowed, assembled condition (FIGS. 9 and 10), forming a cylindrical shell or frustoconical shell-shaped sidewall.

Briefly, the opposed end edges 35*b*, 35*b*' of the sidewall support 27 are configured to mate and join together, in the assembled condition, forming the substantially cylindrical or frustoconical shell shape. Such coupling may be provided by various coupling techniques widely applied. In some techniques, the coupling may be more permanent, or semi-permanent, such as through fasteners, an adhesive, ultrasonic welding or the like. Preferably, however, the end edges 35*b*, 35*b*' are configured to removably couple together, such as a snap-fit connection, which would permit disassembly if desired. Another particular technique that incorporates a hinged coupling will be further detailed below.

Figure 9:
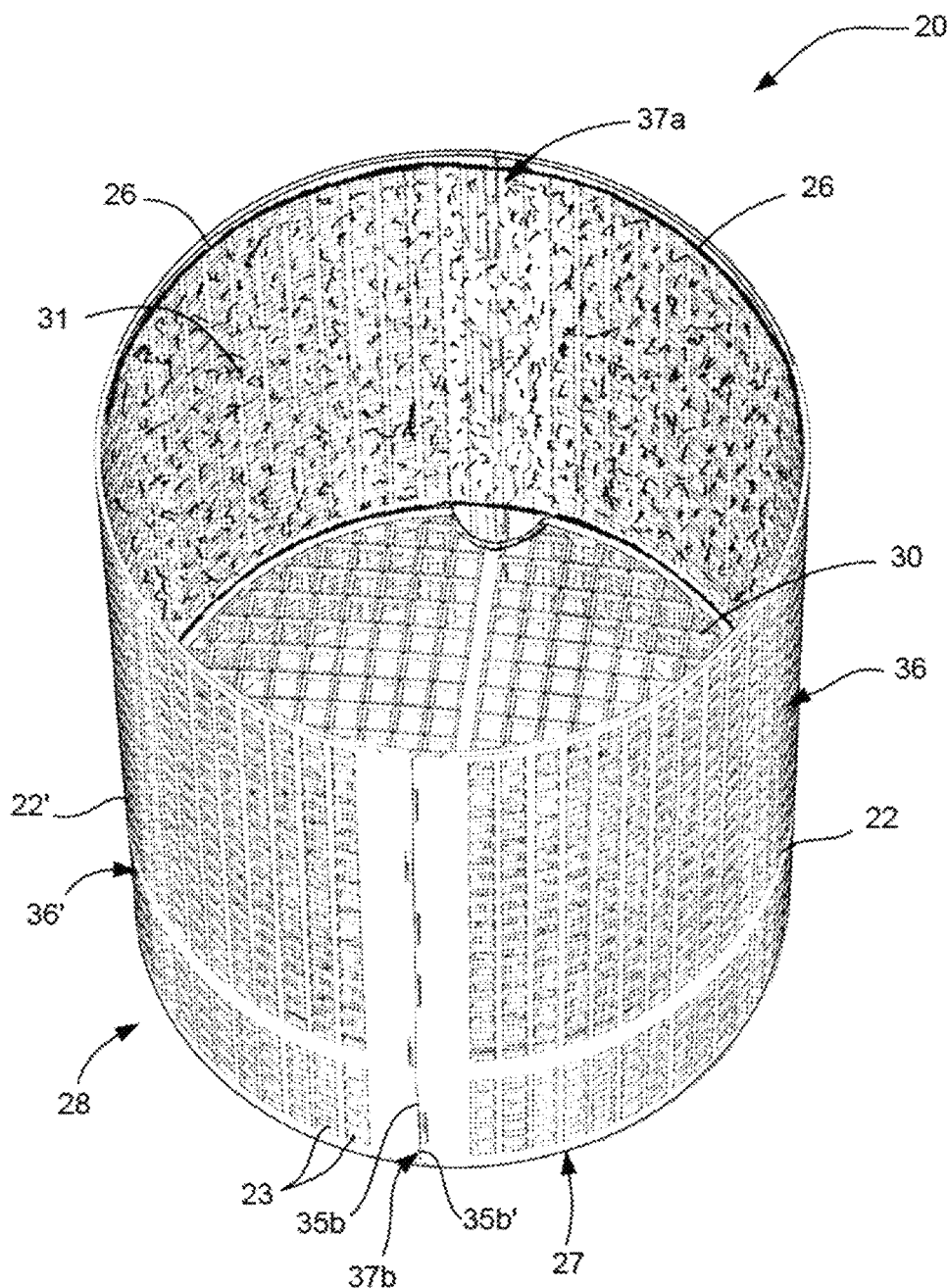
FIG. 9 is a top perspective view of the container assembly of FIG. 7, in an assembled condition, and showing positioning of the absorbent liner material.
Figure 10:
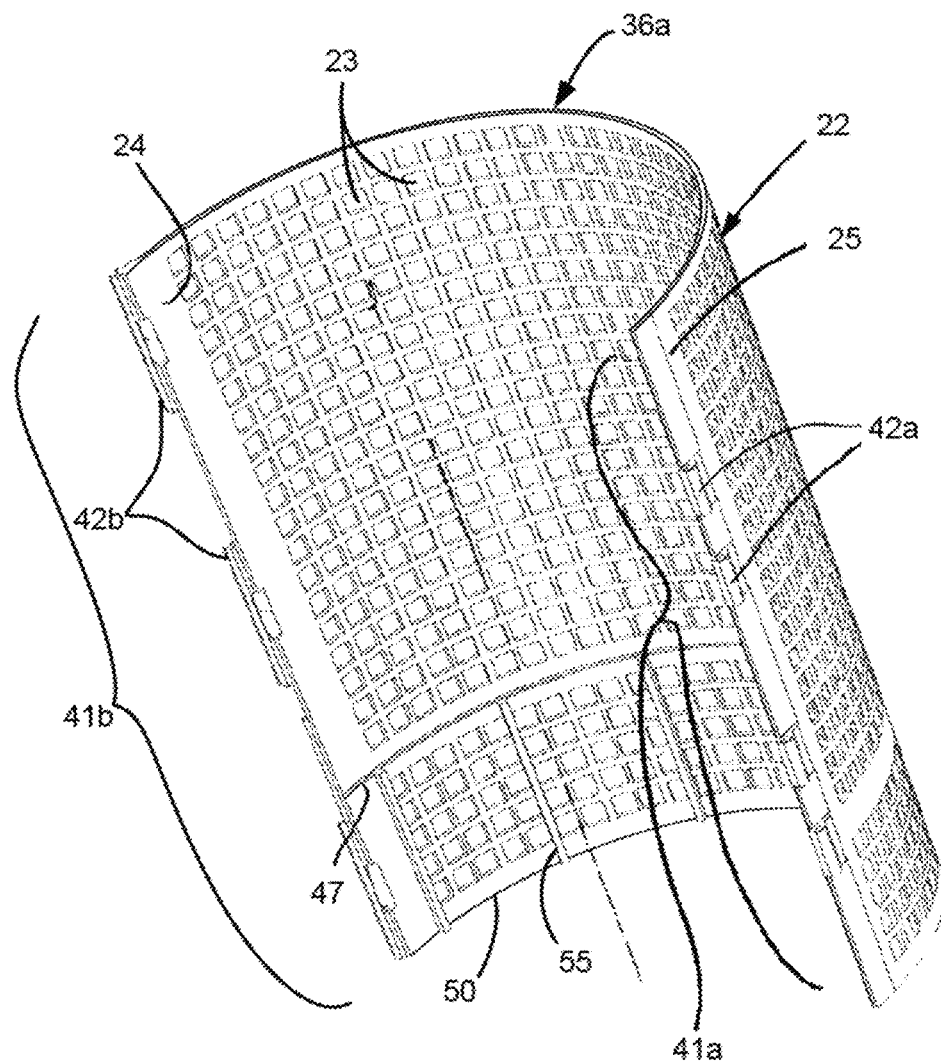
FIG. 10 is a top perspective view of one sidewall member of the container assembly of FIG. 7, with the sidewall member in a bowed, assembled condition.
Figure 11:
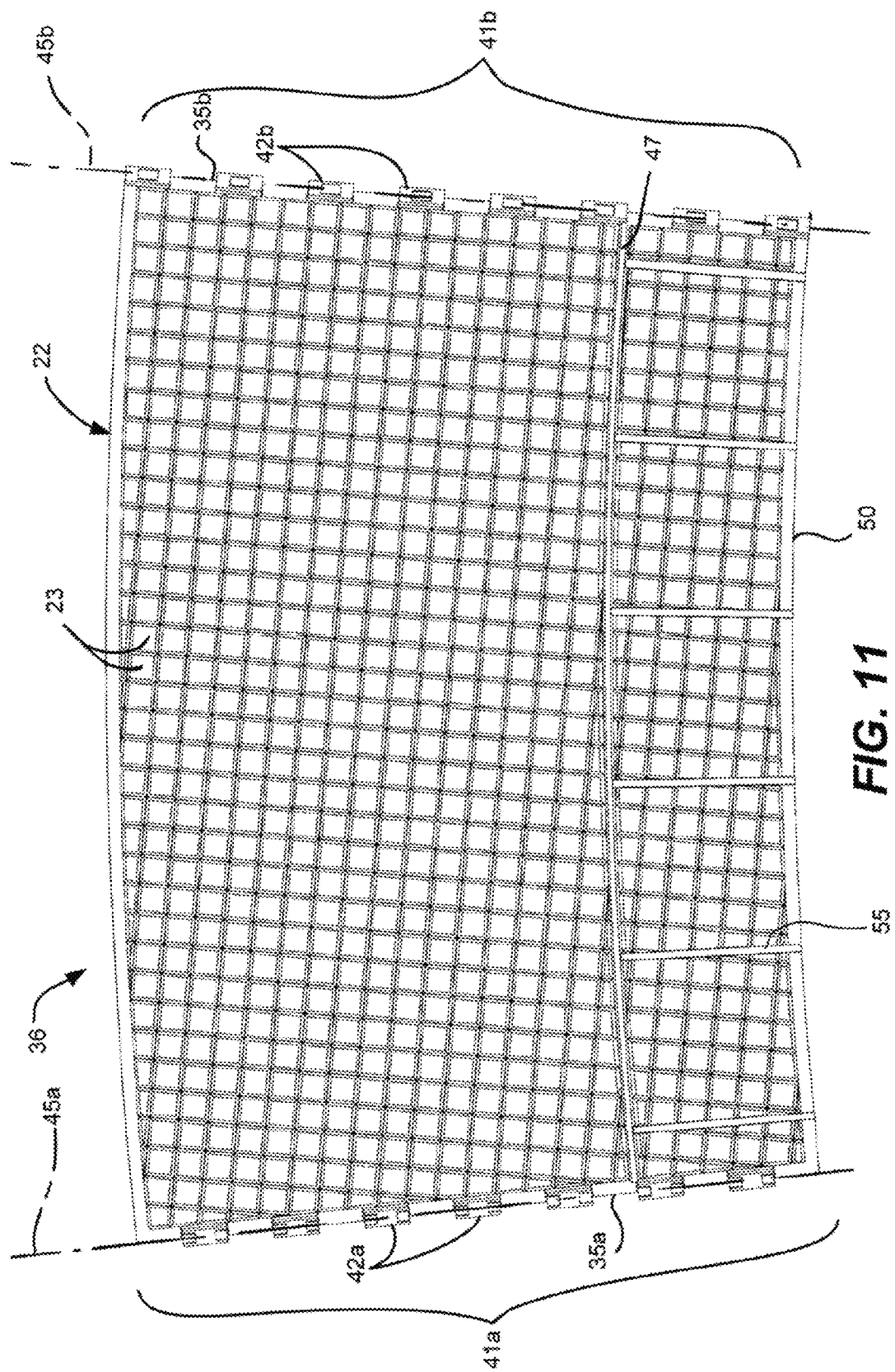
FIG. 11 is a side elevation view of the one sidewall member of FIG. 10, in a substantially planar, non-assembled condition.

Referring now to the embodiments of FIGS. 7-20, the sidewall support 27 incorporates a multi-piece sidewall design having at least a first and a second sidewall member 36, 36' that cooperatively couple together in an end-to-end (i.e., 35*a*, 35*a*') and an end-to-end (i.e., 35*b*, 35*b*') manner to form the assembled sidewall support. Preferably, each sidewall member 36, 36' is similarly sized and dimensioned to one another. As mentioned, each sidewall member 36, 36' incorporates the sheet-like lattice framework 22, 22', and is sufficiently flexible to resiliently bow from the natural, substantially planar, non-assembled condition (FIGS. 7, 8 and 11-14) to a bowed, assembled condition (FIGS. 9, 10 and 15). In the bowed, assembled condition, each end edge 35*a*, 35*b* and 35*a*', 35*b*' of each respective sidewall member 36, 36' is bowed about 90° from the substantially planar, non-assembled condition, to substantially form a semi-cylindrical or semi-frustoconical shape (FIG. 9). Collectively, the two bowed sidewall members 36, 36' cooperate, when mounted in an end-to-end and an end-to-end manner, in the assembled condition, form the cylindrical/frustoconical shell-shaped container device 28.

Briefly, it will be appreciated that to form the cylindrical shell-shaped sidewall support 27, each of the first and second sidewall member 36, 36' is substantially rectangular-shaped, in the substantially planar, non-assembled condition. In contrast, for the tapered, frustoconical shell-shaped sidewall support 27, each sidewall member 36, 36' is initially substantially trapezoid shaped, in the substantially planar, non-assembled condition. Regardless of the particular shape selected, each sidewall member 36, 36' defines respective opposed end edges 35*a*, 35*b* and 35*a*', 35*b*' that mount end edge to end edge (35*a*, 35*a*') and end edge to end edge (35*b*, 35*b*') with the opposed sidewall member.

As mentioned above, the respective end edges 35*a*, 35*a*' and 35*b*, 35*b*' of the opposed first and second sidewall members 36, 36' are preferably removably coupled together via a first hinged mechanism 37*a*, and a second hinged mechanism 37*b*. These opposed hinge mechanisms 37*a*, 37*b* each permit pivotal movement of the respective end edges 35*a*, 35*a*' and 35*b*, 35*b*' about respective hinge axes 38*a*, 38*b* of rotation, extending in directions substantially parallel to the joined end edges.

Figure 12:
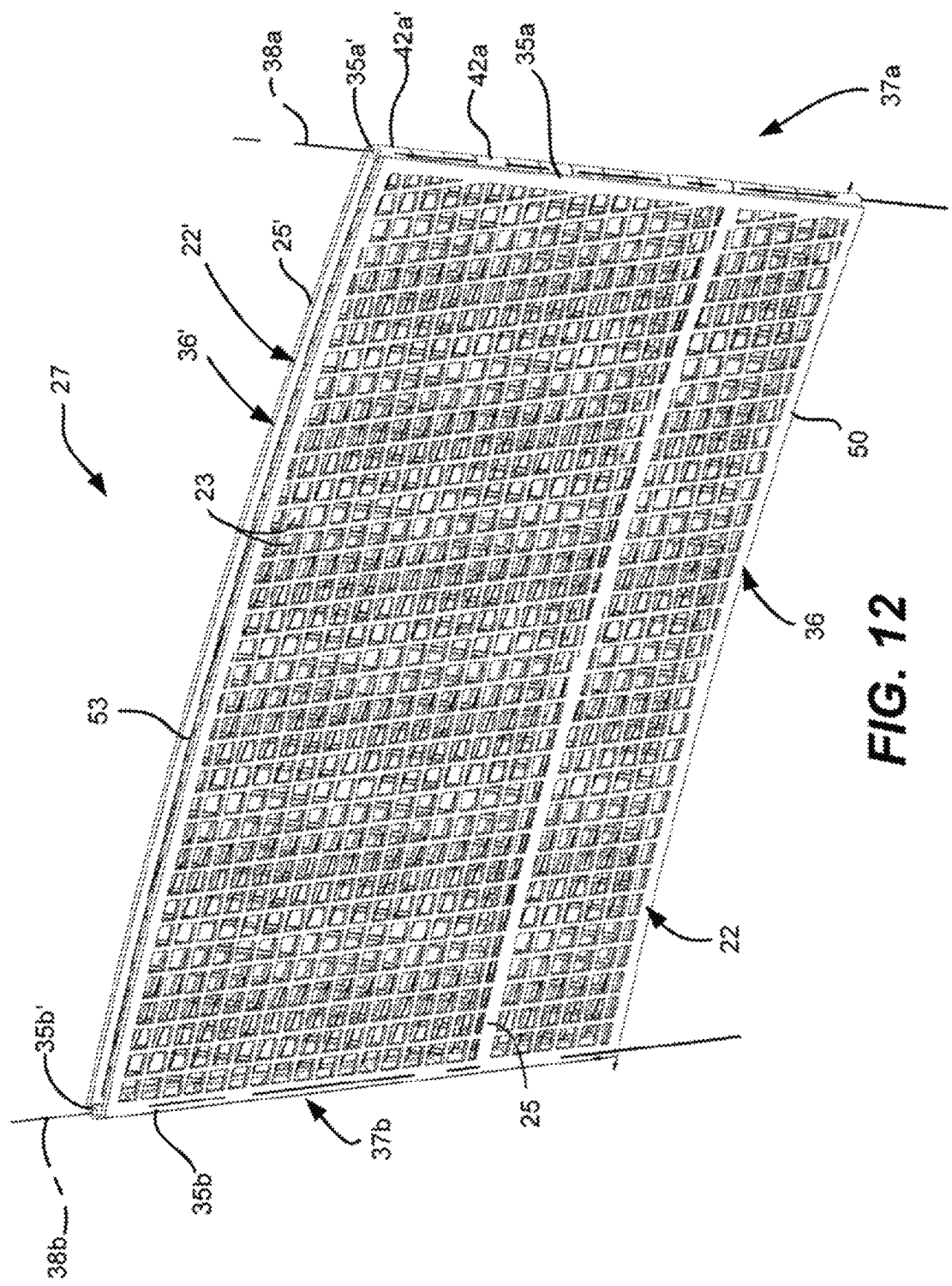
FIG. 12 is a side perspective view of a pair of connected sidewall members, both in the substantially planar, non-assembled condition, of the multi-piece sidewall container assembly of FIG. 7.
Figure 13:
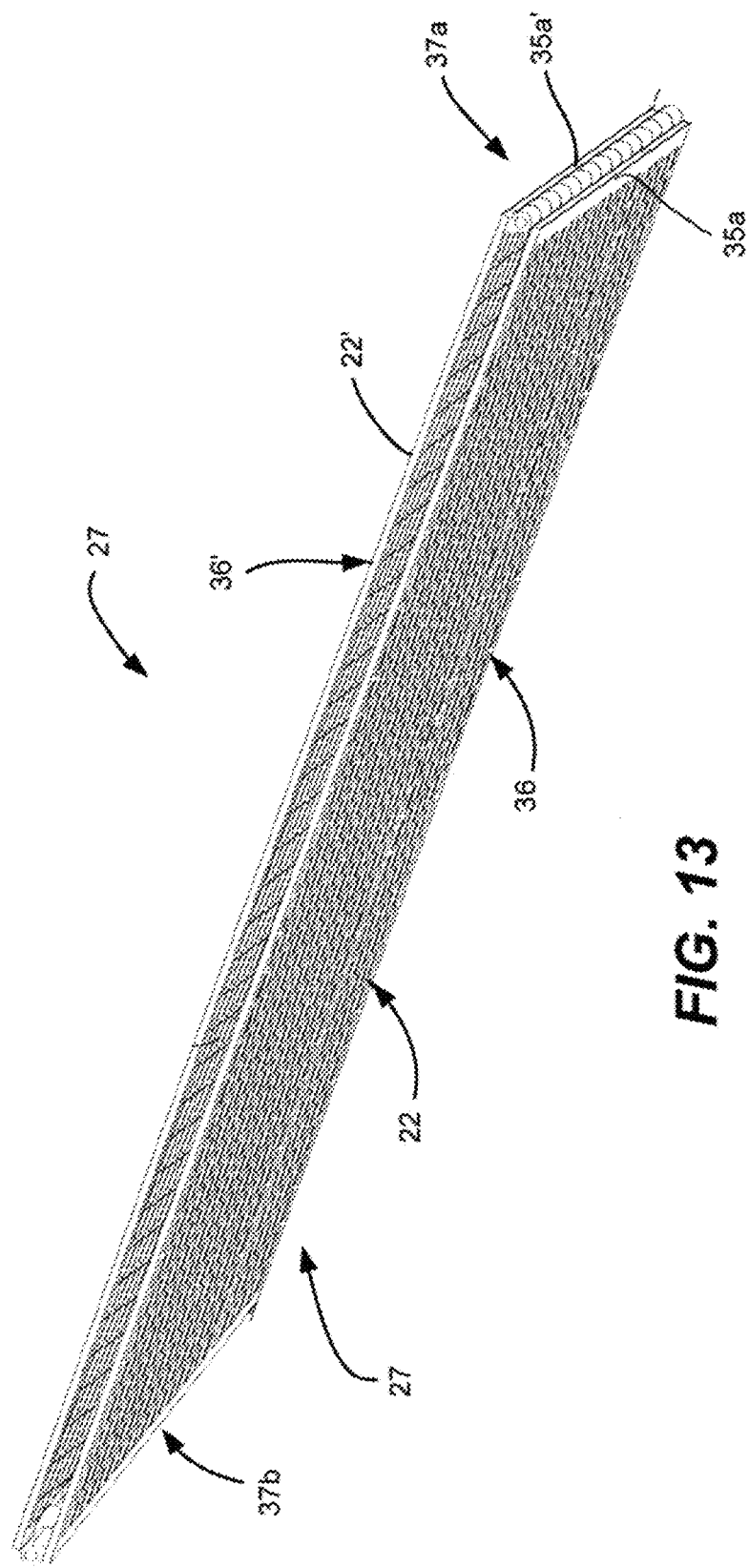
FIG. 13 is a top perspective view of the sidewall members of the multi-piece sidewall container assembly of FIG. 12.

In one particular embodiment, as shown in FIGS. 12 and 13, these assembled hinge mechanisms 37*a*, 37*b* allow transportation of the container device 28 while the sidewall members 36, 36' are in a substantially planar, non-assembled condition. Accordingly, as will be described in greater detail below, such couplings allow the simplified assembly of the container device, especially in the frustoconical shaped container device 28. By simply inserting the bottom support 30 into the interior cavity, the circumferential edge 40 of the bottom support 30 can be applied to contact the respective interior surfaces of the sidewall members, and urge the hinge mechanisms from a closed position (FIGS. 12 and 13), when the sidewall members 36, 36' are in the substantially planar, non-assembled condition, to an opened position (FIGS. 7 and 8), simultaneously bowing the flexible sidewall members toward the assembled condition (FIG. 9).

As best viewed in FIG. 9, the first and second hinge mechanisms 37a, 37b are preferably configured such that the hinge axes 38a, 38b of rotation are oriented within the interior cavity side of the container device 28, while in the assembled condition. In this manner, both substantially closed hinge mechanisms 37a, 37b can be mounted to and assembled with substantially planar sidewall members 36, 36', in the non-assembled condition, to facilitate transportation (FIGS. 12 and 13). This interior orientation of the hinge axes 38a, 38b is beneficial in that the hinge mechanisms 37a, 37b can be simultaneously operated from the closed condition to the opened condition (i.e., from about 0° to about 180°) without interfering contact with the first and second sidewall members 36, 36', as they flex from the substantially planar, non-assembled condition to the bowed, assembled condition.

Figure 16:
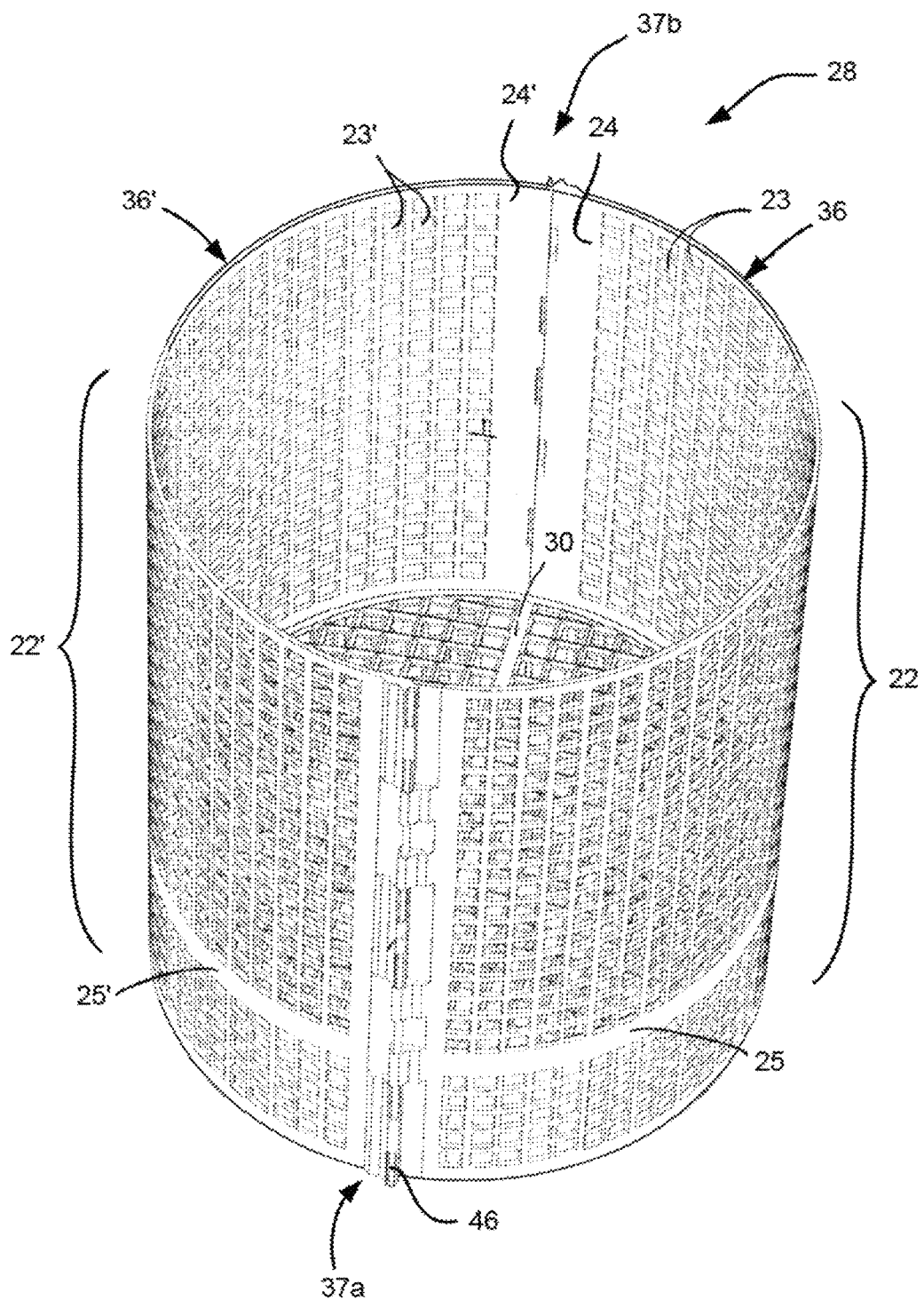
FIG. 16 is a top perspective view of an alternative embodiment to the multi-piece sidewall container assembly of FIG. 9, with a hinge mechanism oriented outside of the container assembly.

It will be appreciated, however, that the hinge mechanisms 37a, 37b can be configured such that the hinge axes 38a, 38b of rotation are oriented on the exterior side of the container device 28 (FIG. 16). In this embodiment, the hinge mechanisms cannot simultaneously hingeably couple the substantially planar sidewall members 36, 36' together, in the non-assembled condition, and further do not enable the sidewall members to bow toward the assembled condition without disassembly of at least one of the hinge mechanisms.

The first and second hinge mechanisms 37a, 37b will be described. Since both the first and second hinge mechanisms 37a, 37b are substantially similar, however, only the first hinge mechanism 37a will be detailed. As shown in FIG. 18, integrated along each opposed end edge 35a, 35a' is a first set 41a of bracket member 42a, on the first sidewall member 36, and a corresponding second set 41a' of bracket member 42a', on the opposed second sidewall member 36', of the first hinge mechanism 37a. These opposed bracket members 42a, 42b are alternatively spaced apart, and correspondingly aligned with one another along the respective opposed end edges 35a, 35a'. That is, the first set 41a of bracket member 42a is disposed along the respective opposed end edges 35a of the first sidewall member 36, and the second set 41a' of bracket member 42a' is disposed along the respective opposed end edges 35a' of the second sidewall member 36', albeit off-set with one another.

To position the collective first hinge axis 38a at the interior cavity 31 of the container device 28, each of the first set 41a and the second set 41a' of bracket members 42a, 42a' extends outwardly from the respective interior wall 24, 24' along the corresponding end edges 35a, 35a'. Each bracket member 42a, 42a' further defines a respective longitudinal first and second passage 43a, 43a', extending longitudinally therethrough that are coaxially aligned along a common first and second longitudinal axis 45a, 45a', with respect to their respective bracket set 41a, 41a'.

Figure 17:
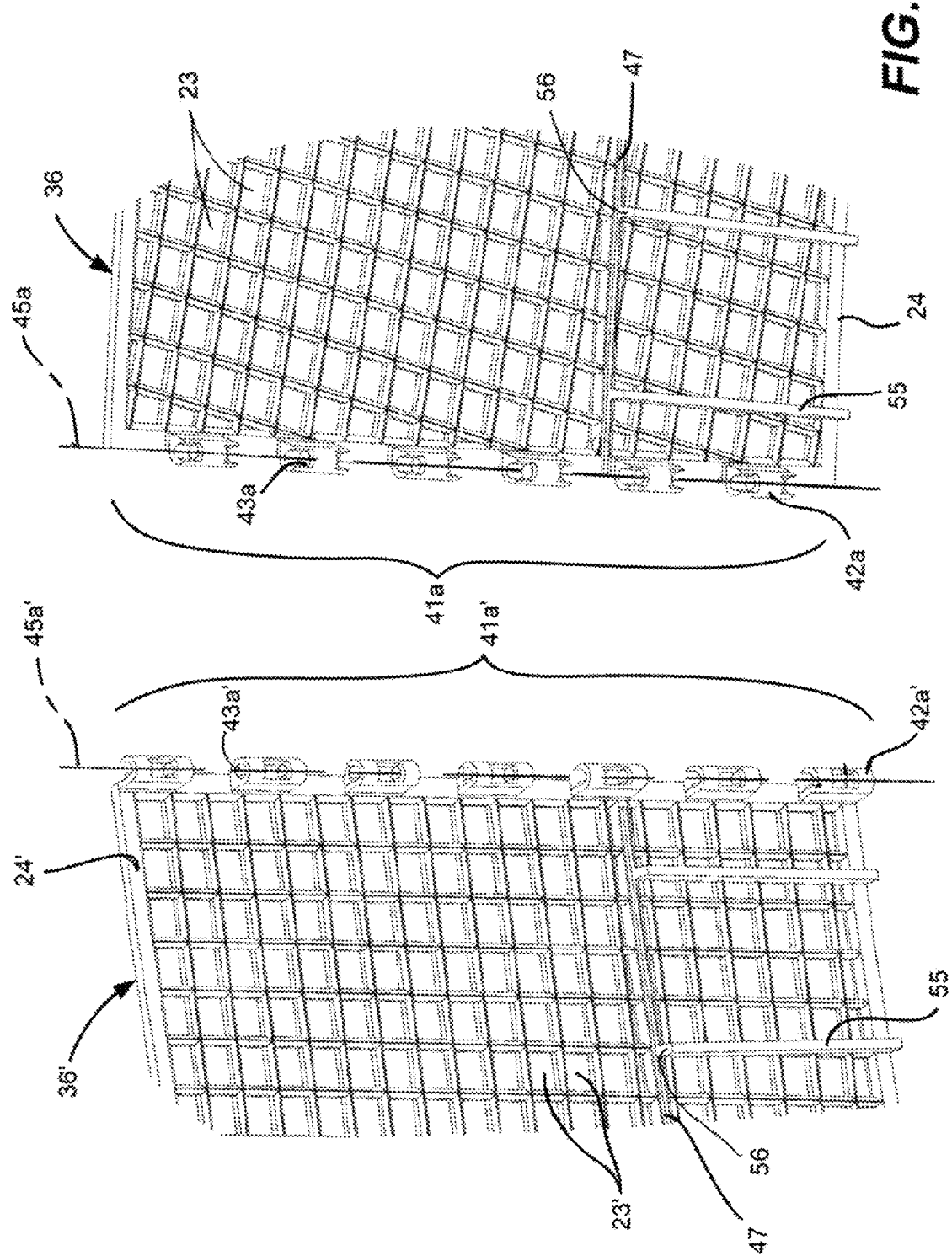
FIG. 17 is an enlarged, fragmentary, top perspective view of a hinge mechanism of coupling the opposed sidewall members of the multi-piece sidewall container assembly of FIG. 7.

These opposed bracket members 42a, 42a' of the first and second set 41a, 41a' are spaced apart from one another, within each set, and are correspondingly off-set from one another, as a set, with respect to the opposing set. As best illustrated in FIGS. 8 and 17, the first and second set of bracket members can thus be engaged and intercoupled with one another, in a manner substantially coaxially aligning both the first longitudinal axis 45a and the second longitudinal axis 45a' along a common first hinge axis 38a.

Figure 7:
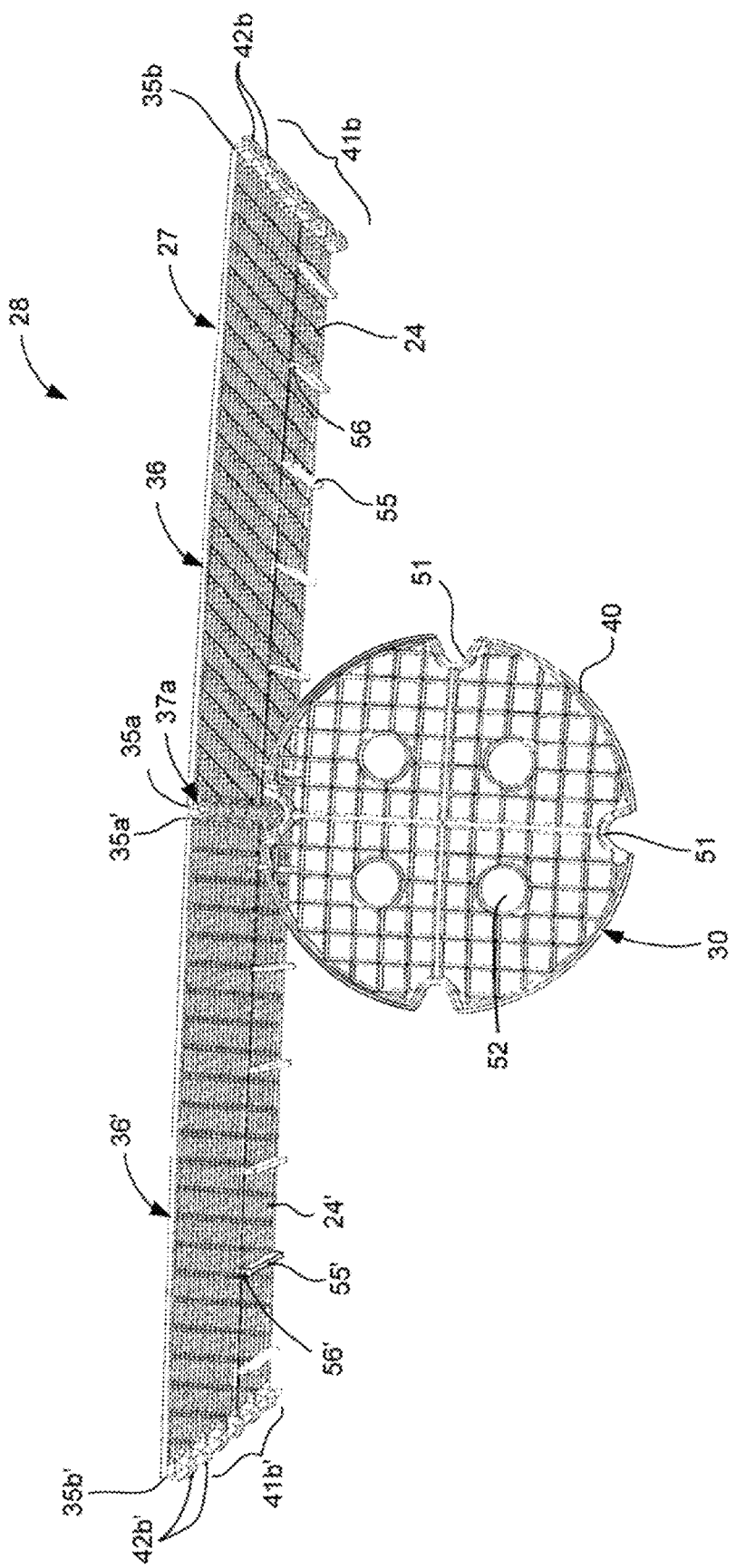
FIG. 7 is a top perspective view of a multi-piece sidewall alternative embodiment to the container assembly of FIG. 1, in a non-assembled condition.
Figure 8:
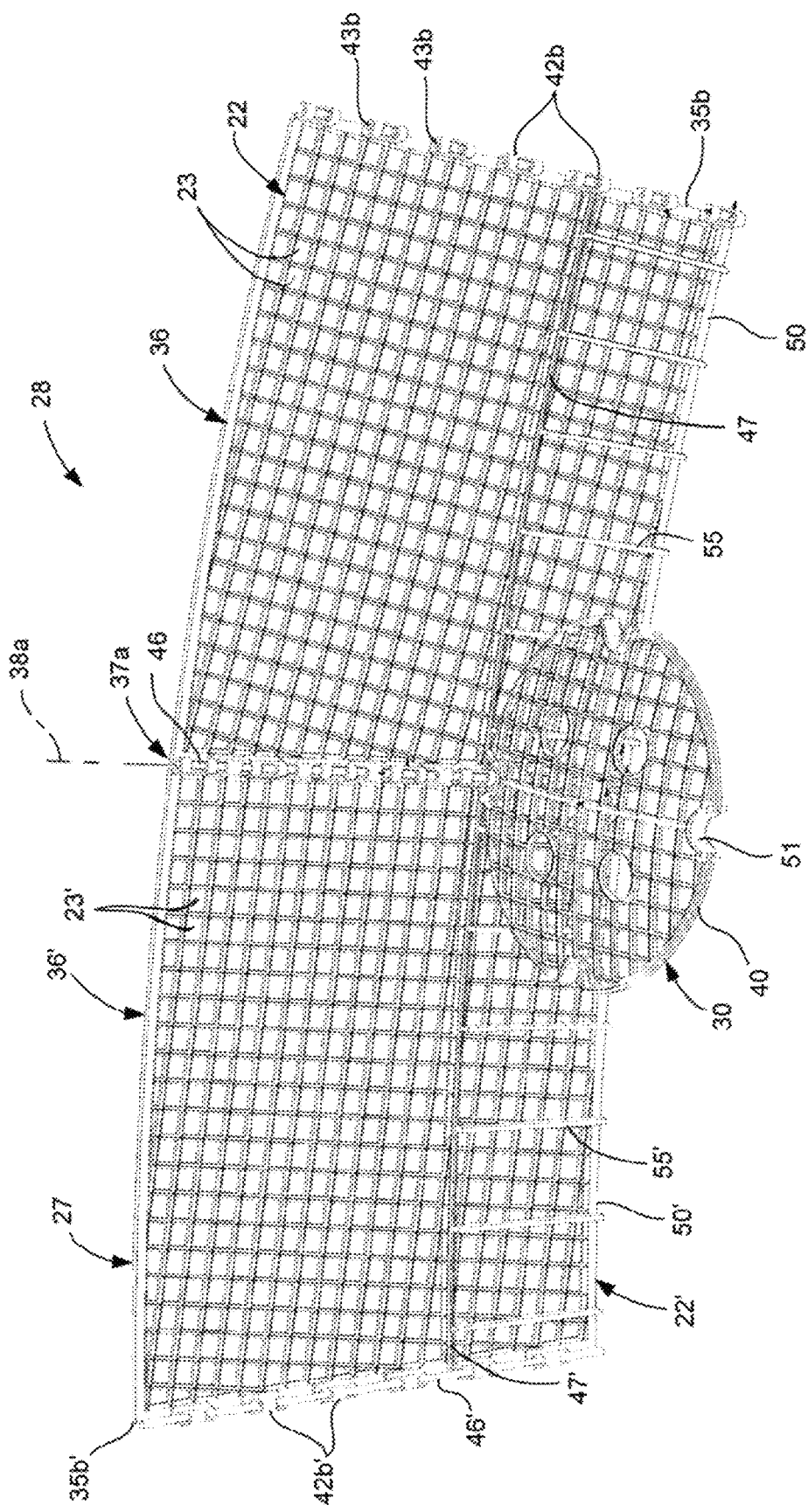
FIG. 8 is side perspective view of the container assembly of FIG. 7.
Figure 14:
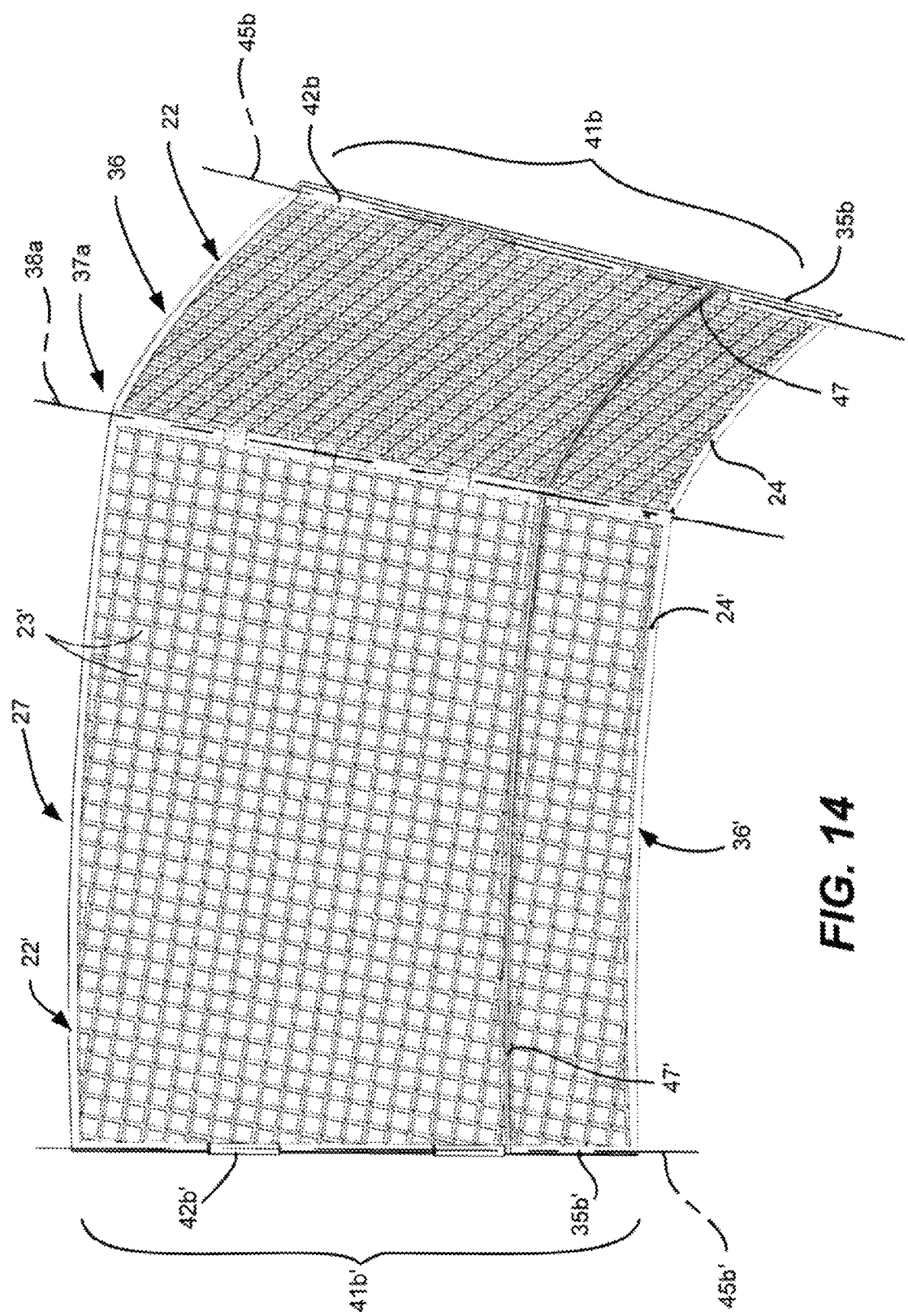
FIG. 14 is a side perspective view of the sidewall members of FIG. 12, with the sidewall members hinged at 90° relative to one another.
Figure 15:
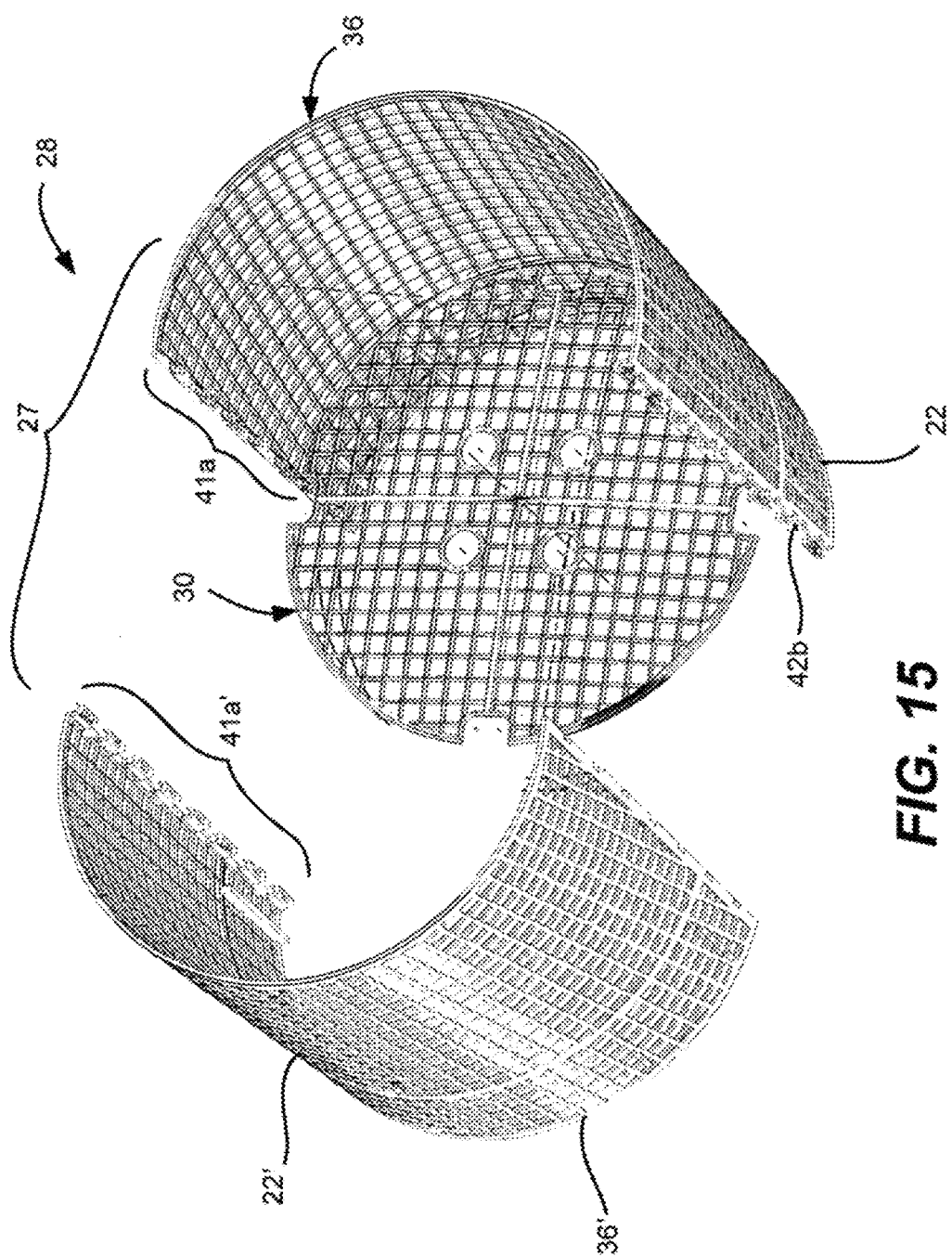
FIG. 15 is an exploded, top perspective view of the multi-piece sidewall container assembly of FIG. 9, showing movement of one sidewall member from a substantially planar, non assembled condition to a bowed, assembled condition.

To facilitate such hinged coupling, when the corresponding first set and second set of bracket members 42a, 42a' are engaged and intercoupled, a hinge rod 46 can be axially received through the coaxially aligned first and second hinge passages 43a, 43a' (FIGS. 7, 8 and 14). The diameter of the hinge rod 46, therefore, is substantially similar to that the longitudinal passages 43a, 43a' so as not to permit too much lateral movement between hinge passages and the hinge rod. The diameter of the rod 46, however, should not be too large so as to prevent or impede hinged movement of the corresponding bracket member about the first respective hinge axis 38a.

It will be appreciated that the corresponding longitudinal spacing or distance between adjacent bracket members 42a of the first set 41a, and that of the adjacent bracket members 42a' of the set 41a' is generally equal to the longitudinal length of the corresponding bracket member 42a', 42a to be alternately engaged and intercoupled in these respective longitudinal spaces therebetween. Accordingly, such relatively snug sliding receipt, and intercoupling, between the bracket members provides axial support, as well as lateral support, therebetween when the first and second hinge mechanisms 37a, 37b are assembled together.

As above mentioned, assembly of the bottom support 30 with the coupled first and second sidewall members 36, 36' is required to define the bottom of the container interior cavity 31, as well as provide vertical support to contain the growing medium therein. The bottom support 30, however, provides several other functions as well, such as partially defining the general curvilinear shape of sidewall support 27, via engaging contact with the sidewall members, bowing them toward their respective assembled condition. Accordingly, when the bottom support 30 is engaged against the sidewall members, the bottom support not only provides vertical support, but also provides lateral support and structural integrity to the container device 28.

The bottom support is preferably substantially circular, having a stepped peripheral edge 40 that engages the sidewall members 36, 36'. It will be appreciated, however, that the peripheral edge could be other curvilinear shapes as well, such as oval shaped.

The bottom support 30, as shown in FIGS. 7, 8, 14, 18 and 19, thus, is also preferably more structurally robust than the wire mesh design of the embodiments of FIGS. 1-5. As mentioned, the bottom support 30 must have sufficient structural integrity to vertically support the plant 21 and the growing medium in the container interior cavity, but have sufficient structural integrity to partially facilitate the shape definition of the container sidewall support 27.

Figure 20:
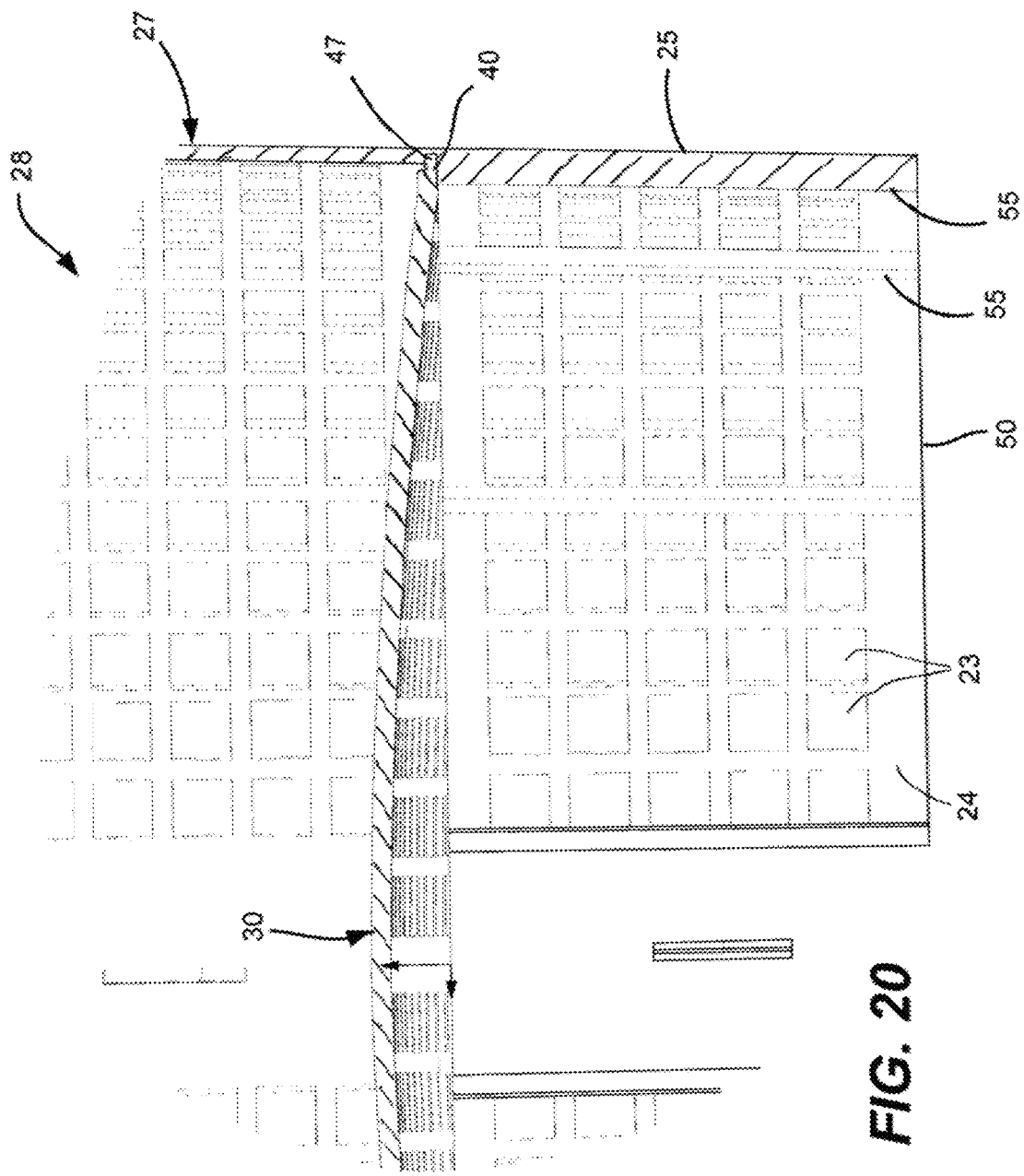
FIG. 20 is an enlarged, side elevation view, in cross-section, of the container assembly of FIG. 19, illustrating mounting of the bottom portion to the sidewall framework.

In one particular embodiment, as shown in FIG. 20, the bottom support 30 is partially dome shaped, having a raised middle or central section and a lower outer peripheral edge 40. From the middle section to the outer peripheral edge 40, the interior wall of the bottom support 30 gradually slopes downwardly at the outer radial portions thereof. This configuration in beneficial in that greater structural strength is attained.

In another configuration, as shown in FIGS. 18 and 19, the bottom support 30 may incorporate a relatively uniform thickness domed top plate portion 44. This domed plate portion 44 provides the lattice framework that defines the plurality of apertures therethrough. To provide additional lateral and vertical support, at two or more integral cross-support ribs 49 extend underneath the domed plate portion 44. Such cross-supports provide additional vertical support and structural strength.

To accommodate, support and mount the bottom support 30, the interior walls 24, 24' of the respective sidewall members 36, 36' define a receiving groove 47, 47' extending substantially linearly and horizontally thereacross when in the substantially planar, non-assembled condition. These opposed receiving grooves 47, 47', as shown in FIGS. 7, 8, 17 and 20, are further aligned with one another, and are sized and dimensioned for sliding receipt of the stepped peripheral edge 40 of the bottom portion, in a sliding, snap-fit manner, when oriented in the circular assembled condition.

The receiving grooves 47, 47' are preferably vertically oriented about one inch to about six inches from the bottom edges 50, 50' of the sidewall members 36, 36'. As mentioned above, the bottom support 30 is preferably raised a sufficient distance from the ground so as to provide room or a space beneath the bottom support 30 of the container device for the roots to air root prune. Moreover, by raising the bottom support, perched water is avoided.

As best illustrated in FIGS. 18 and 19, the circumferential or peripheral edge 40 may define two or more recesses 51 strategically oriented to accommodate the hinge mechanisms 37a, 37b that protrude into the interior cavity 31. As shown in one particular configuration, four recesses 51 are defined by the stepped peripheral edge 40 of the bottom support 30 that are equally spaced about 90° apart from the adjacent recess. Moreover, two or more finger holes 52 may also be included to facilitate gripping of the bottom support 30. In turn, assembly of the container device 28 is also facilitated, which will now be described in greater detail.

As previously indicated, assembly of the container device 28, when in the non-assembly condition of FIGS. 12 and 13, may commence by simply inserting the bottom support 30 into the interior cavity. If the container device 28 is substantially cylindrical-shaped, when in the assembled condition, insertion of the bottom support 30 may be easier from the bottom of the collapsed sidewall support 27 since this is the end closer to the receiving grooves 47, 47' then insertion from the opposite end thereof. However, if the container device 28 is substantially frustoconical, insertion of the bottom support 30 may be easier from the top of the collapsed sidewall support 27 this end is wider than the opposite side due to the taper of the sidewall members.

One particular assembly technique is to turn the bottom support 30 sideways, longitudinally aligning the elongated peripheral edge 40 with the elongated opening into the collapsed interior cavity 31 that is formed between the two opposed sidewall members 36, 36', in the non-assembled condition. Once a portion of the bottom support 30 is received in the elongated slit 53, the flexible sidewall members 36, 36' can commence bowing thereof. Simultaneously, the bottom support 30 can be slowly rotated in a manner coaxial aligning a longitudinal axis of the bottom support 30, with a longitudinal axis of the sidewall support 27, when in the assembled condition. As the engaging contact between the bottom support peripheral edge 40 and the interior walls 24, 24' of the sidewall members 36, 36' increases, bowing of the flexible sidewall members increasingly continues toward their semi-cylindrical shell shape or semi frustoconical shell shape. The hinge mechanisms 37a, 37b also simultaneously move from the closed condition (FIGS. 12 and 13), when the sidewall members 36, 36' are in the substantially planar, non-assembled condition, toward the opened position (FIGS. 7 and 8).

Contact of the peripheral edge 40 with the interior walls 24, 24' of the sidewall members continues as the bottom support is urged toward the receiving grooves 47, 47'. The recesses 51 of the peripheral edge 40 should be aligned to receive the protruding bracket members of the hinges so that they will not interfere with bottom support 30 during installation. Once the stepped peripheral edge 40 is snap-fit, peripherally received into the respective receiving grooves, installation of the bottom support 30 will be complete.

To provide additional vertical support to the bottom support mount, a plurality of upstanding rib members 55, 55' is provided, in one specific configuration, protruding and/or upstanding interiorly from the respective interior wall 24, 24' of the first and second sidewall members 36, 36' (FIGS. 7, 17 and 20). When the sidewall members 36, 36' are oriented in the assembled condition, thus, the rib members 55, 55' generally protrude from the respective interior walls 24, 24' radially inward. Each rib member 55, 55' further extends longitudinally along the respective sidewall interior wall 24, 24' from a lower portion thereof to an orientation terminating substantially at, or just below, the respective receiving grooves 47, 47'. In this manner, each rib member 55, 55' forms a respective support ledge 56, 56' for the bottom support 30 to seat against when the peripheral edge 40 is slideably received in the respective receiving grooves 47, 47'. Additional vertical support is thus provided as the bottom support 30 rests against these end ledges 56, 56' of the respective upstanding rib members 55, 55'.

Once the container device 28 is assembled, the thin moisture absorbent liner material 26 can be disposed juxtaposed the sidewall members 36, 36'. The liner material 26 may be disposed outside and juxtaposed to the container sidewall support 27, although it is preferably disposed on the inside of the container device, as well as against the bottom support 30 thereof if desired, wherein the lattice framework 22 can provide lateral support to the moist absorbent liner material when the growing medium is added to the interior cavity 31 of the container device 28.

In still another specific configuration, two absorbent liner materials 26 can be disposed substantially adjacent and juxtaposed to the sidewall support 27, an inner liner material 26 that is disposed adjacent the interior wall thereof, and an outer liner material 26 that is disposed adjacent the outer wall of the sidewall support 27. Collectively, these two absorbent liner materials straddle the lattice framework, forming an isolation or buffer airspace therebetween at each aperture, similar to double paned window concept. This configuration is beneficial in that the airspace partially isolates the inner liner material from direct exposure to the environment (especially direct sunlight). Moisture evaporation from the inner liner material, thus, is significantly decreased.

It will be appreciated, however, that the increased humidity created between two liner materials 26 in this buffer airspace, is not sufficient to prevent root desiccation, and thus air root pruning, as the root tip penetrates the inner liner material.

As will be understood, any sized container can be utilized to make up a plant container according to the selected plant size. It is understood that the plant will be removed from the container and moved to a larger container or planted into the landscape within a reasonable amount of time.

In one technique using the present invention, the root ball can be shifted to progressively larger container assembly, each of which incorporates the sidewall support and absorbent liner material in accordance with the present invention, as the plant and root ball grow. For example, a transplantable plant can be initially set in a smaller liner cell containing the properties of the present invention. As the plant increases in size, the root ball (with or without the older liner material) can be shifted to progressively larger container assembly (e.g., 1 gallon to 2 gallon to 3 gallon). This has been found to significantly create a fibrous root system free of root defects.

In another aspect of the present invention, turning now to FIGS. 21-31, another bounding system 70 is provided for a transplantable plant. This bounding system includes a bounding apparatus 71 having a sheet-like sidewall framework 72 that collectively defines a sidewall surface area. In accordance with the present invention, the sidewall framework 72 includes a plurality of elongated rib members 73, spaced apart from one another, and defining a plurality of elongated, spaced sidewall apertures 75 between each adjacent rib member that collectively define a sidewall aperture area. The sidewall aperture area comprises at least about 50% of the sidewall surface area.

As best viewed in FIGS. 24 and 25, looking downwardly into the bounding apparatus 71, each elongated rib member 73 defines an interior facing surface 76 that is convex-shaped in a transverse cross-sectional dimension thereof. As will be described in greater detail below, this curvilinear geometric shape facilitates the deflection of any outward root growth in contact with the rib members toward and out through the adjacent sidewall apertures 75 rather than causing the root growth to be deflected back toward the interior of the bounding apparatus 71.

The bounding apparatus further includes a bottom support 77 having a support surface area. This bottom support is coupled to the sidewall framework 72 such that the two structures cooperate to define a cavity 80 formed for receipt of the growing medium therein. The bottom support 77 further includes a sheet-like bottom framework 81, which also defines a plurality of spaced bottom wall apertures 82 therethrough. The bottom support 77 is adapted to promote and encourage air root pruning of the transplantable plant proximate the bottom support when the same is vertically oriented at a location above the ground by a sufficient distance.

Accordingly, the convex interior profile of the interior facing surface 76 of each elongated rib members 73 (regardless of their orientation) facilitates any root growth contacting these surfaces 76 to be deflected into and through the respective adjacent sidewall apertures 75. Examples of such deflection are represented by the path of arrows 83-85, as shown in FIG. 25. In contrast, it has been observed that in situations where any root growth contacts a flatter or more planar interior facing surface, such as if the interior facing surface 76 where flatter or more planar, root growth contacting such a surface is more likely to be directed back inward toward the cavity 80 of the bounding apparatus (similar to a conventional plant container) rather than out through the adjacent apertures.

In the simplest form, the transverse cross-sectional dimension of the convex interior facing surface is generally semicircular. It will be appreciated, however, that other semi-curvilinear convex shapes can be adopted as well. Furthermore, the elongated rib members 73 are illustrated as generally upright, and are disposed substantially parallel to one another (FIGS. 26 and 27). It will further be appreciated, however, that the elongated rib members 73 could be generally horizontally or diagonally oriented. For example, the elongated rib members 73, if generally horizontally oriented could be provided by a plurality of spaced ring members aligned around a longitudinal axis thereof. Moreover, the adjacent elongated rib members 73 need not be the same width, equally spaced, or be substantially parallel relative to one another.

The illustrated bounding apparatus of FIGS. 24-27 includes a collective aperture area in the range of at least about 50% of the total collective surface area of the sidewall surface area. It will be appreciated, however, that depending upon the selected container shape, as well as the rib member spacing, the a collective aperture area may range from at least about 50% to about 95% of the total collective surface area of the sidewall surface, and is more preferably in the range of about 60% to about 95% thereof.

To provide structural integrity to the elongated rib members 73, one or more cross-rib members 86 are provided that the rib members are affixed to. These cross-rib members 86 generally prevent movement of the elongated rib members 73 relative to one another, and may be disposed on either the exterior side of the bounding apparatus or the interior there. In the examples of FIGS. 26 and 27, these cross-rib members 86 are shown disposed generally perpendicular to the elongated rib members, as rings.

Figure 33:
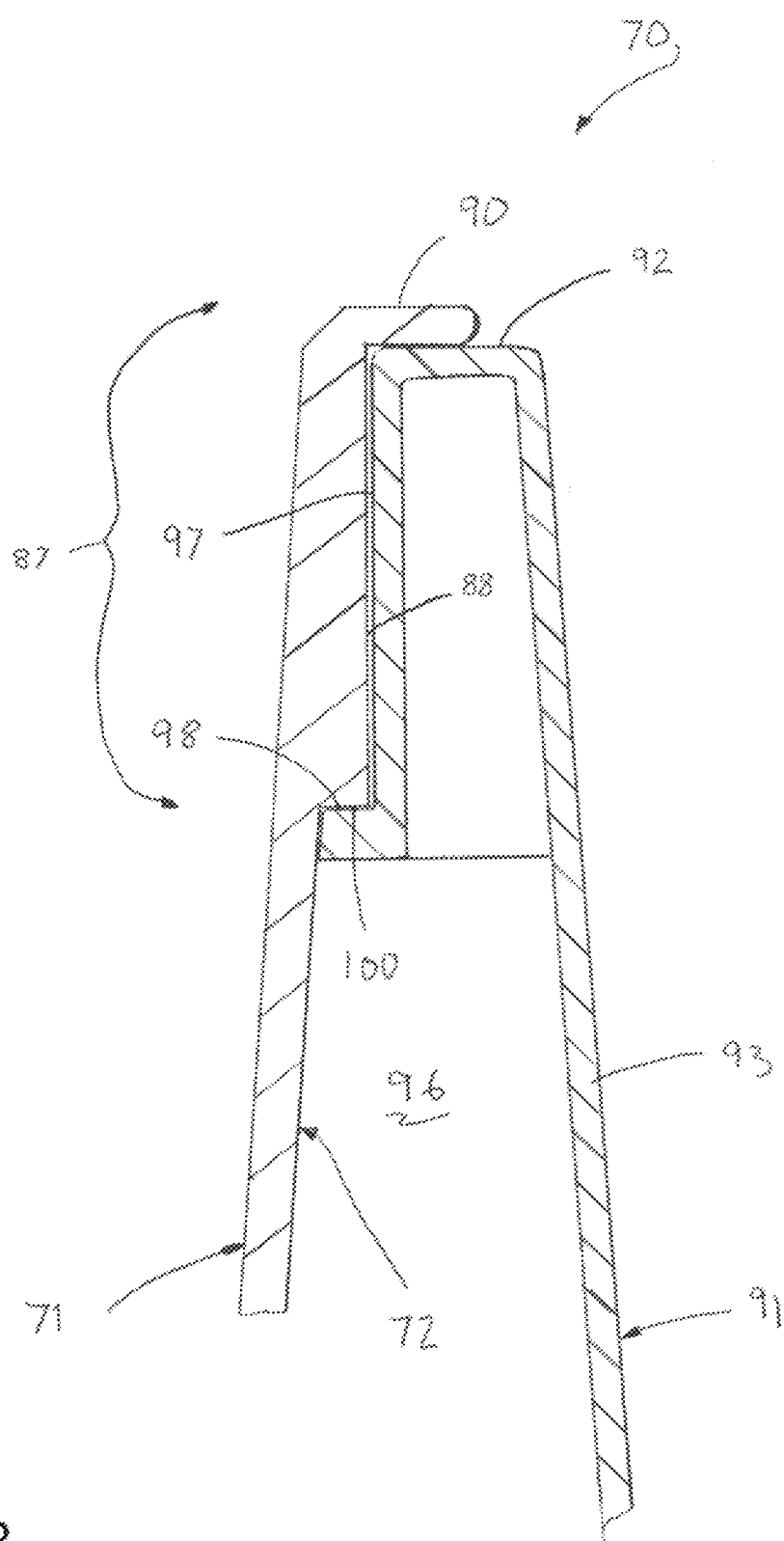
FIG. 33 is a fragmentary, enlarged, side elevation view, in cross-section, of an upper portion of the boundary system of FIG. 23.
Figure 37:
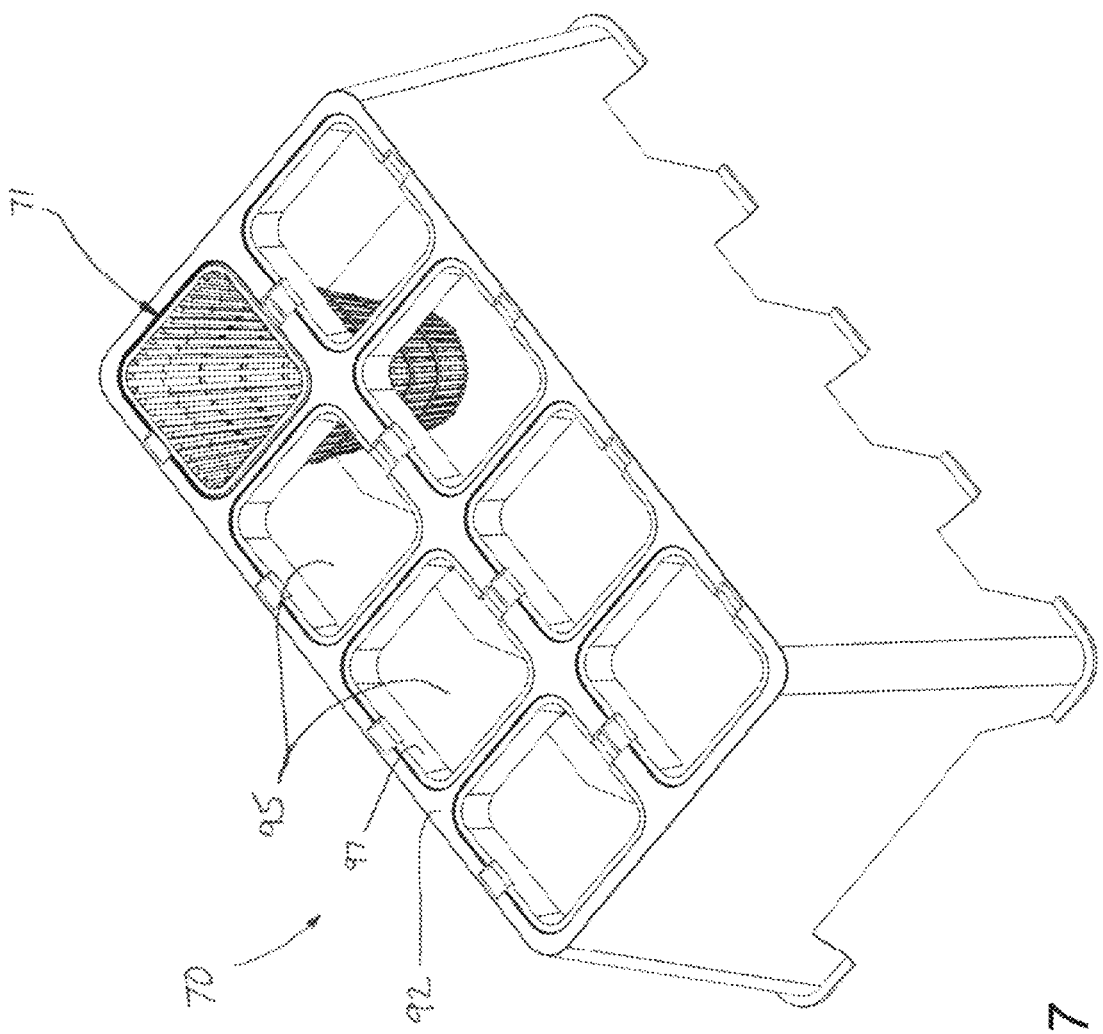
FIG. 37 is a top perspective view of an alternative embodiment boundary system having a support tray configured to support eight boundary apparatus.
Figure 38:
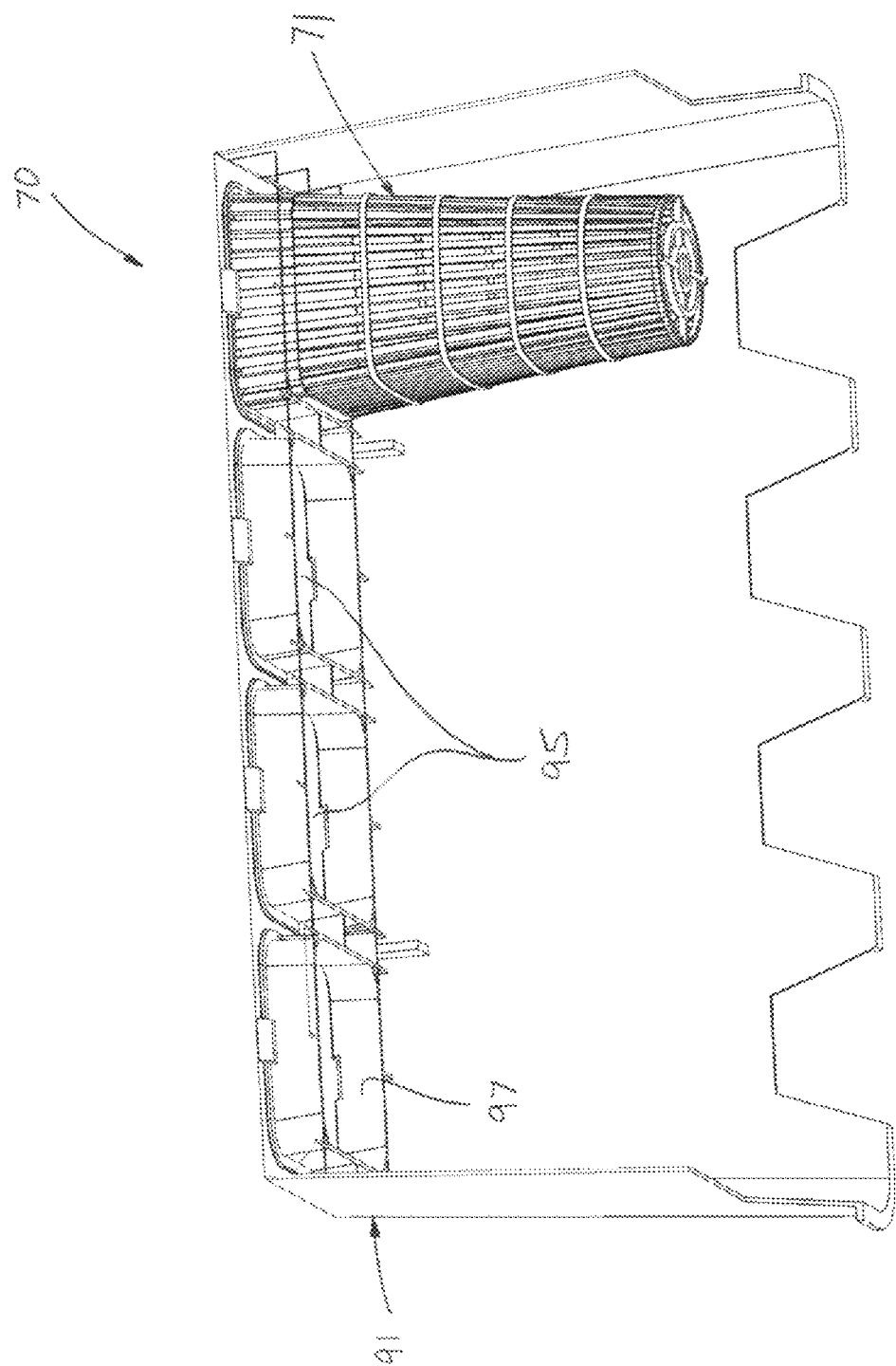
FIG. 38 is an enlarged, bottom perspective view, in cross-section, of the alternative embodiment boundary system of FIG. 37.
Figure 39:
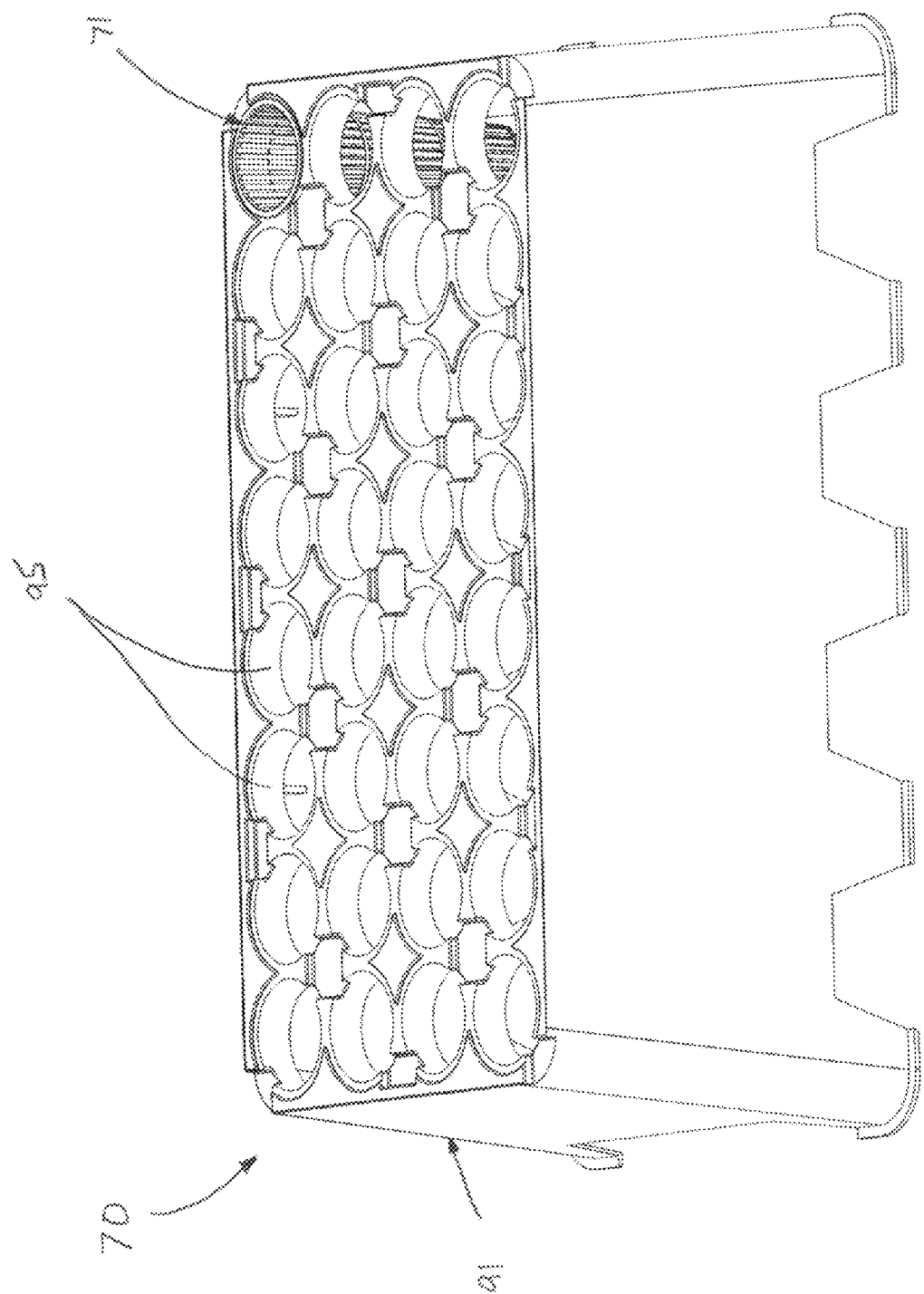
FIG. 39 is a top perspective view of another alternative embodiment boundary system having a support tray configured to support thirty-two boundary apparatus.
Figure 40:
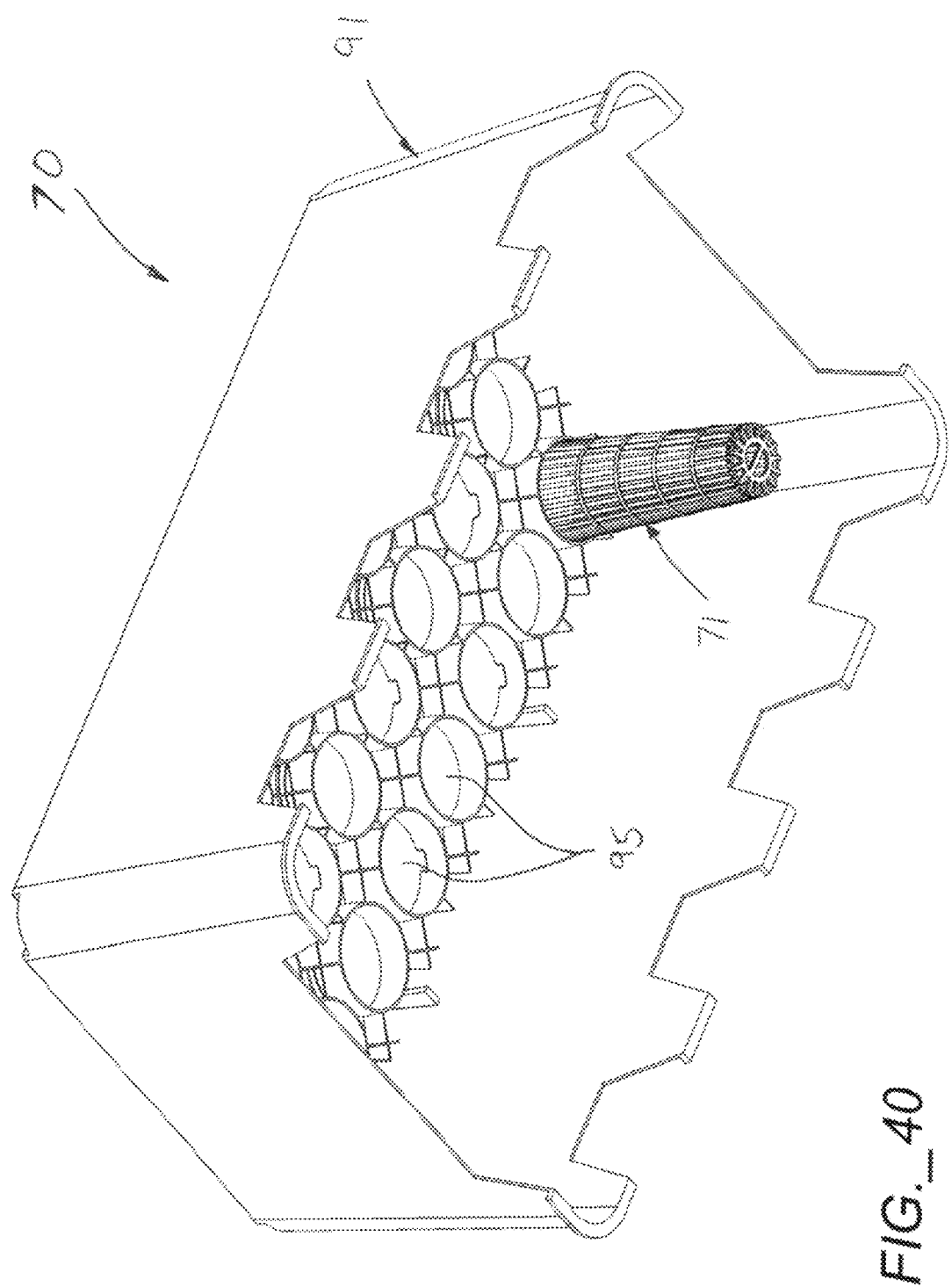
FIG. 40 is a bottom perspective view of the alternative embodiment boundary system of FIG. 37.

At an upper portion of the bounding apparatus 71, as best shown in FIGS. 26, 27 and 33, an annular collar member 87 is provided to improve the structural integrity. This L-shaped collar member includes an outer ring portion 88 and an upper ledge portion 90 extending radially outward from an upper distal edge of the outer ring. By providing significantly more structural support to the upper portion of the rib members, similar to the structural purpose of the cross-rib members 86, heavy lifting and handling the bounding apparatus 71 can attained.

Referring now to the sheet-like bottom framework 81 of the bottom support 77, it will also be appreciated that this framework can be structured similar to that of the sidewall framework 72. For example, any ribbing also preferably includes an interior facing surface having a convex-shaped dimension in a transverse cross-sectional dimension. Moreover, the a collective bottom wall aperture area may range from about 50% to about 95% of the total collective bottom surface area of the bottom surface, and is more preferably in the range of about 60% to about 95% thereof.

In accordance with another aspect of the present invention, referring back to FIGS. 21-23, 28, 29, a support tray 91 is further included that facilitates upright support of the bounding apparatus while simultaneously positioning the bottom support 77 of the bounding apparatus at least at the sufficient distance above the ground. The support tray 91 is comprised of a relatively solid, fluid impervious, sheet material, having a tray top portion 92 and a surrounding sidewall 93. The tray top portion 92 defines a receiving opening 95 therethrough that is formed and dimensioned for supportive receipt of the bounding apparatus 71 therein such that the bottom support 77 of the bounding apparatus is vertically oriented at least at the sufficient distance above the ground (i.e., about one inch to about six inches). In accordance with the present invention, the surrounding sidewall 93 and the container sidewall framework 72 define a humidifying airspace 96 therebetween, so surround the bounding apparatus such that rapid dry-down at the container sidewall framework 72 is significantly reduced.

Accordingly, the support tray significantly reduces, if not eliminates, wind and sun exposure of the exposed growing media contained at the sidewall apertures 75 and the bottom support wall apertures 82 significantly reducing rapid dry-down of the exposed growing media. Moreover, the air movement of the immediately surrounding the sheet-like sidewall framework 72 is also significantly reduced, essentially creating a dead airspace (i.e., the humidifying airspace 96) between the container sidewall framework 72 and the surrounding sidewall 93, as well as between the sheet-like bottom framework 81 and the ground. In effect, the significant reduction of the rapid dry down, as well as the significant reduction of air movement, in this dead airspace, creates a surrounding high humidity area to further promote air root pruning. As best viewed in FIG. 32, the high humidity in this dead airspace enables the roots to extend a greater distance outside of the container sidewall framework 72 while allowing some air flow at the bottom thereof. Some tree species, for example, have very aggressive tap root characteristics and may require a more significant air flow at the bottom to keep the tap root in check. In turn, lateral root growth is further promoted.

Turning now to FIGS. 28, 29, 32 and 33, the support tray 91 of the bounding system 70 is now described in greater detail. As mentioned, the support tray 91 includes rigid surrounding sidewall 93 that tapers outwardly from the upper portion to bottom portion thereof. Accordingly, when the corresponding bounding apparatus 71 is supportively contained therein, the sidewall framework 72 of the bounding apparatus 71 and the surrounding sidewall 93 of the support tray 91 taper away from one another in opposite directions, creating a greater dead airspace at the bottom of the boundary apparatus.

The tray top portion 92 defines a receiving opening 95 into a recess of the support tray 91, the receiving opening 95 of which is defined by an annular, generally vertical, receiving wall 97. This receiving wall 97 is formed and dimensioned for axial sliding receipt of the collar member 87 therein. Hence, there must be a sufficient diametric tolerance between the outer ring portion 88 and the receiving wall 97 to enable unencumbered sliding movement therebetween.

Figure 23:
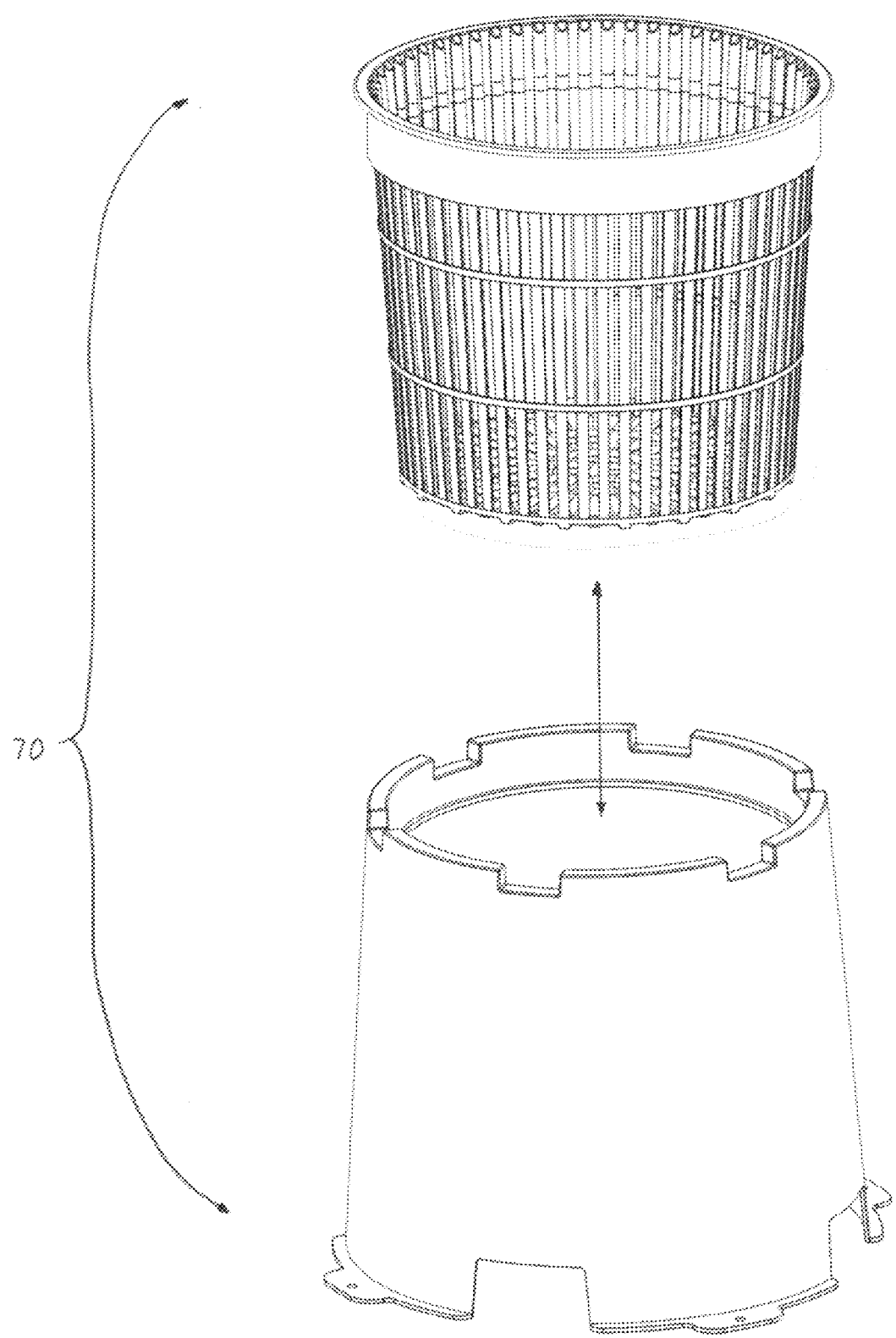
FIG. 23 is an exploded, top perspective view of the boundary system of FIG. 21, illustrating the boundary apparatus and the support tray.

The bounding apparatus 71, thus, is formed for removable mounting in the recess of the support tray 91 between a mounted position (FIGS. 21, 22 and 33) and a removed position (FIGS. 23, 26 and 27). In the mounted position, the support tray 91 and the bounding apparatus cooperate to vertically orient the bottom support 77 of the bounding apparatus above the ground by a sufficient distance such that air root pruning is promoted and/or encouraged. As mentioned, such sufficient distance is generally in the range of about one inch to about six inches. It will be appreciated, however, for some small volume containers and young plant life, the lower end spacing from the ground could be as little as ⅛-½ inch. In the removed position, in contrast, the bounding apparatus 71 is separated from seating in the support tray 91. Any plant or plants growing in the bounding apparatus, thus, can be more easily handled and/or transplanted.

To support the collar member 87 atop the support tray 91, and thus the bounding apparatus itself in the mounted position, the collar upper ledge portion 90 can supportively seat against the tray top portion 92. The radial width of the upper ledge portion 90, of course, must extend radially beyond the perimeter of the receiving opening 95 of the tray top portion 92 such that the bounding apparatus will not slide vertically therethrough (FIGS. 21 and 33).

Other structural arrangements may be employed to facilitate vertically support the bounding apparatus 71 as well. For example, the support tray 91 may include an annular support shoulder 98 that extends radially inwardly from a lower distal edge of the receiving wall 97. As FIG. 33 best illustrates, this annular support shoulder 98 can be sized and dimensioned to enable passage of the bounding apparatus sidewall framework 72, while prevent passage of the collar member 87 therethrough. Hence, this support shoulder 98 is sized such that when the bounding apparatus 71 is slidably and axially received through receiving opening 95, toward the mounting position, an annular lower distal edge 100 of the collar member outer ring portion 88 seats against the support shoulder 98 for vertical support thereof (FIGS. 21 and 33).

Moreover, it will be appreciated that these two seating arrangements for vertical support can be cooperatively combined, providing greater vertical support and mounting stability. Snap-fit or friction-fit structures can also be provided to aid secured mounting as well.

Surrounding the receiving opening 95 are a plurality of radially spaced finger access recesses 101. As best shown in FIGS. 21, 22 and 28, at the tray top portion 92, these recesses 101 enable one to put their fingers underneath the upper ledge portion 90 of the collar member 87. By pulling upward, the bounding apparatus 71 can be separated from the support tray (i.e., moved from the seated position to the removed position).

In accordance with the one aspect of the present invention, a humidification zone is created in the dead airspace 96 between the bounding apparatus sidewall framework 72 and the surrounding sidewall 93 of the support tray. The humidity in the dead airspace 96, of course is dependent upon the ambient air relatively humidity (e.g., it could be relatively dry in California, as compared to that in Florida). The humidity created in this dead airspace 96, given the growing medium dampness, ambient temperature, ambient humidity, wind speed, etc., could near 100% relative humidity, under ideal conditions.

To generally regulate the humidity in this dead airspace 96, thus, the surrounding sidewall 93 incorporates a humidity regulating system 102. In the simplest form, the regulating system 102 may be provided by one or more humidity control openings 103 oriented at, and extending through, a bottom portion of the surrounding sidewall 93. Such control openings 103 permit partial air flow therethrough, generally reducing the humidity.

To more accurately regulate this dead-airspace humidity, the regulating system 102 may include a means for adjusting the size of the control openings 103. For example, sliding doors (not shown) or the like may be incorporated to control the size and positioning of one or more of these openings. Essentially, depending upon the weather and ambient air conditions, the control openings can be strategically positioned, as well as enabling the adjustment of the collective area of the openings 103. For example, reducing the collective area of the humidity control openings (via sliding the doors closed), the humidity can potentially be increased in the dead airspace humidity while fully opening these doors would facilitate a decrease in the dead airspace humidity.

At a bottom portion of the surrounding sidewall 93, plurality of support feet 105 may be provided that extend outwardly therefrom (FIGS. 28 and 29). These support feet 105 provide additional stability as well as providing a means for the bounding system 70 to be removably anchored.

As best illustrated in FIGS. 34-36, various sized and shaped bounding apparatuses 71 are shown which incorporate the features of the present invention. For instance, the volume of bounding apparatus could range anywhere from as small as about 0.06 gallon container to a 60 gallon container. FIGS. 21-33 illustrate a 3-gallon sized container, by way of example while that of FIG. 36 represent a 0.06 gallon container. Further, the upper portion of the bounding apparatus can be rectangular (FIG. 34) as well as circular, although both designs generally tapers radially inwardly from an upper portion thereof to a lower portion thereof. The embodiment illustrated in FIG. 36, by way of example, show a bounding apparatus having wider spaced elongated rib members such that the collective sidewall aperture area may well exceed the lower range 50% of the total collective surface area of the sidewall surface area.

Referring now to FIGS. 37-40, a single support tray 91 is provided that is configured to support multiple bounding apparatuses 71 aligned in an array. This is advantageous in that the grouping these bounding apparatuses 71 in a single support tray 91 further facilitates the reduction of rapid dry down, as well as increasing dead airspace humidity. Multiple bounding apparatus, moreover, can be handled and moved simultaneously. In general, such an approach is more likely to be incorporated for the smaller volume bounding apparatus, such as those illustrated containers shown in FIGS. 34-36.

In this specific embodiment, the tray top portion 92 defines two or more receiving openings 95. Each respective receiving opening 95 is sized and dimensioned for sliding receipt of a respective bounding apparatus 71 therein until supportively seated atop the tray upper portion. These receiving openings 95 are preferably aligned in an array to maximize boundary apparatus spacing. In some configurations, the multiple bounding apparatus support trays 91 could accommodate different sized bounding apparatus as well, although not shown here.

Figure 41:
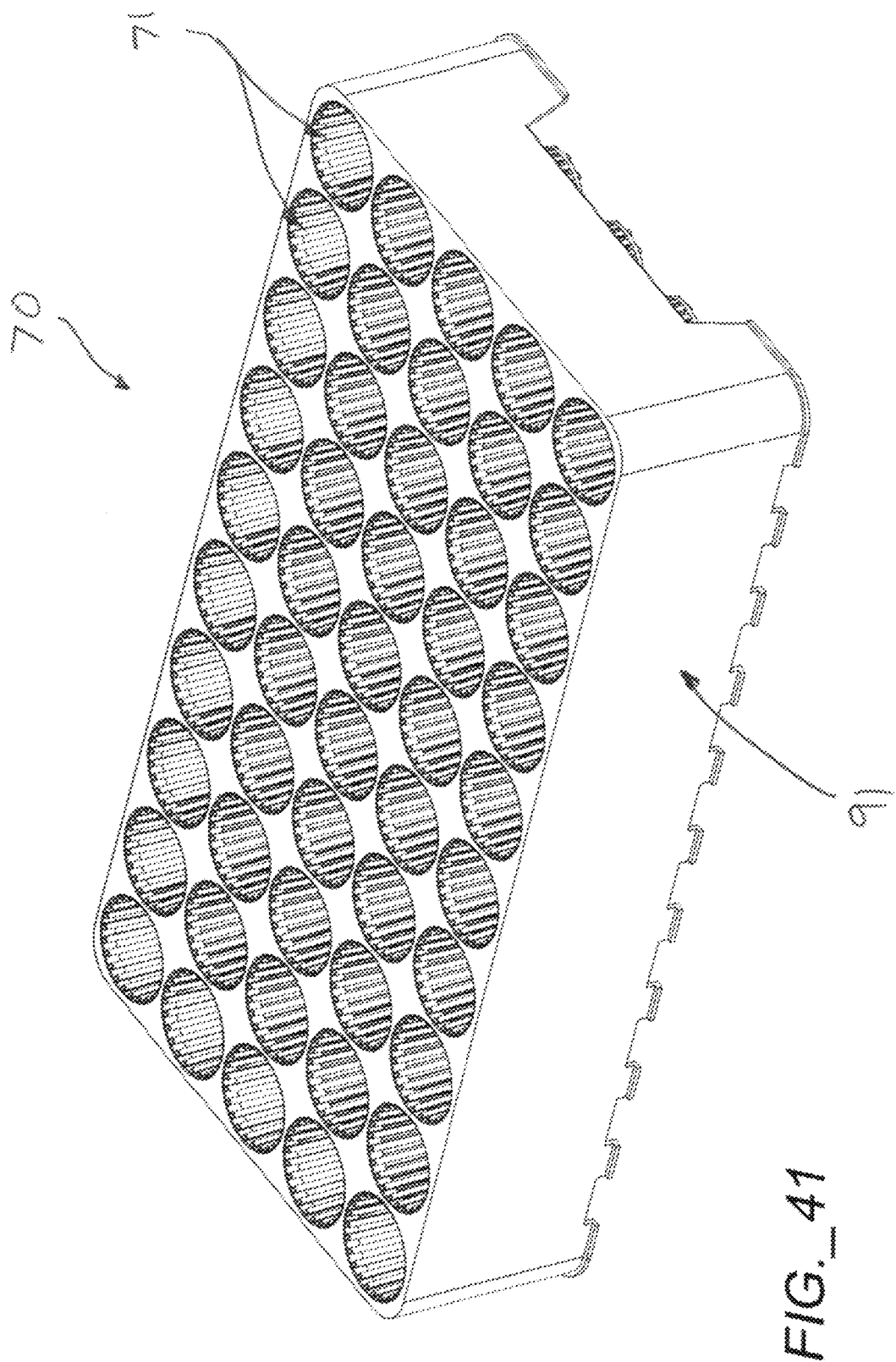
FIG. 41 is a top perspective view of another alternative embodiment boundary system having an integral support tray and boundary apparatus.
Figure 42:
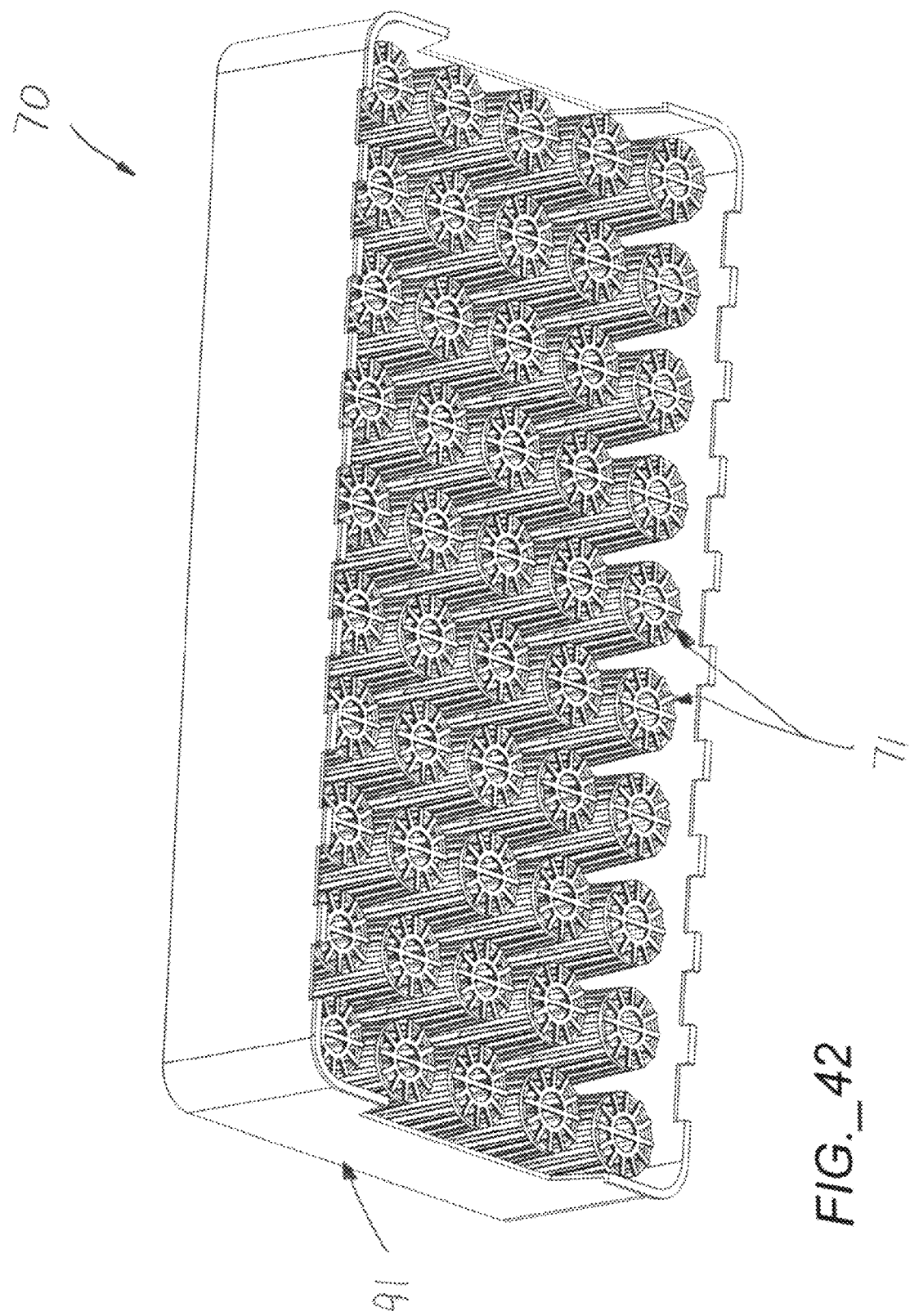
FIG. 42 is a bottom perspective view of the alternative embodiment boundary system of FIG. 41.
Figure 43:
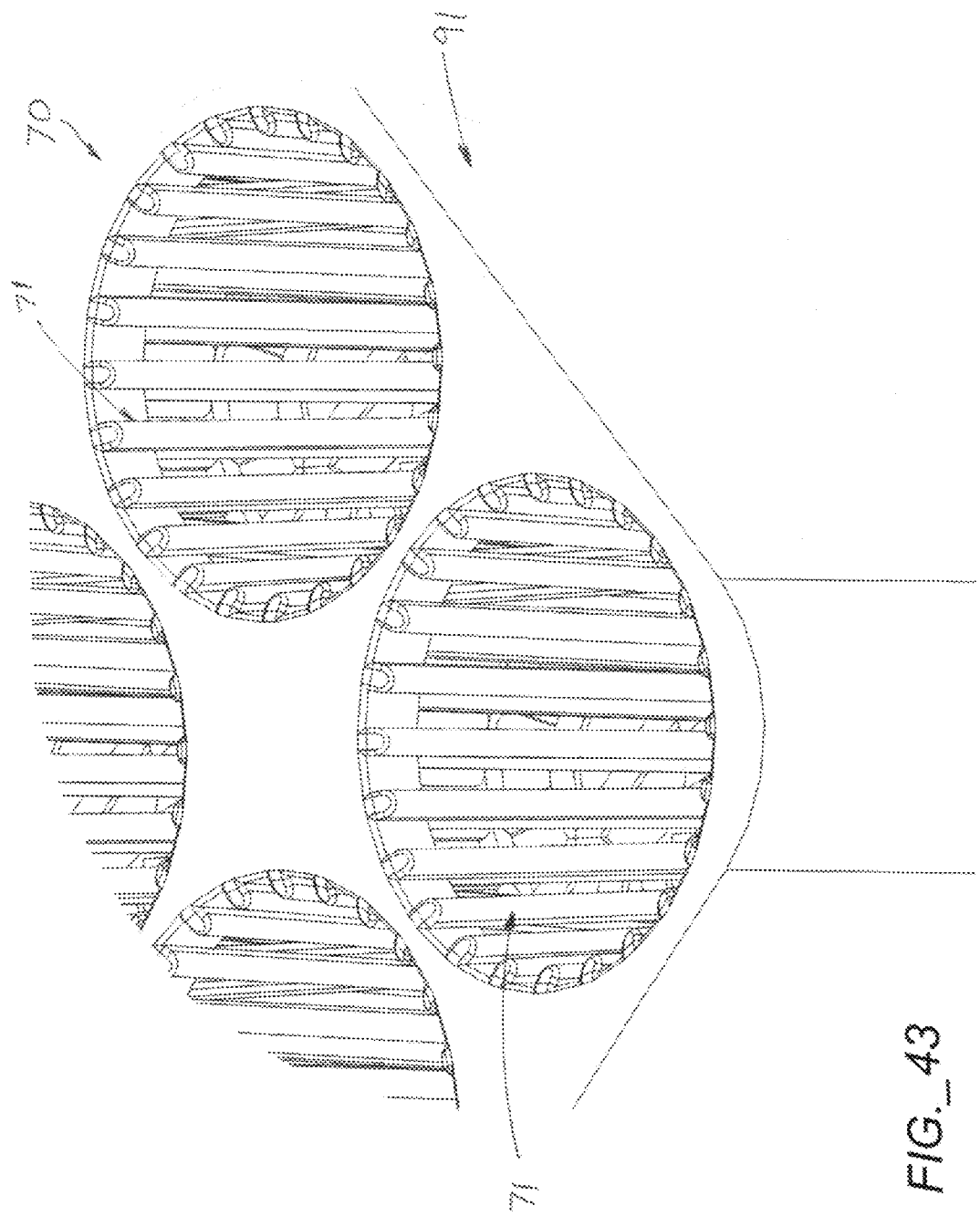
FIG. 43 is an enlarged, top perspective view of the alternative embodiment boundary system of FIG. 41.

In yet another specific embodiment of the present invention, for either the single or multiple bounding apparatus system, the bounding apparatus and support tray can be integrally formed as a single unit. This embodiment is best illustrated in FIGS. 41-43 wherein the upper collar member of each bounding apparatus is essentially integrally formed with the upper surrounding portion of each respective receiving opening.

It will be further understood from the foregoing description that various modifications and changes may be made in the preferred and alternative embodiments of the present invention without departing from the its true spirit.

What is claimed is:

1. A bounding system for a transplantable plant for bounding a growing medium in which the transplantable plant is grown comprising:
    a bounding apparatus including:
    a sheet-like sidewall framework, having a sidewall surface area, defining a plurality of elongated, spaced sidewall apertures therebetween that collectively define a sidewall aperture area, said sidewall aperture area comprises at least about 50% of said sidewall surface area; and
    a bottom support having a support surface area and coupled to said sidewall framework such that said sidewall framework and said bottom support cooperate to define a cavity formed for receipt of the growing medium therein, said bottom support including a sheet-like bottom, framework defining a plurality of spaced bottom wall apertures, said bottom support adapted to promote and encourage air root pruning of the transplantable plant proximate said bottom support when substantially all of respective bottom surfaces thereof are vertically oriented at a location above the ground by a sufficient distance; and
    a support: tray comprised of a relatively solid sheet material, and having a tray top portion and a surrounding sidewall, said tray top portion supportively accommodating said bounding apparatus such that said substantially all of the respective bottom surfaces of said bottom support thereof are vertically oriented at least at said sufficient distance above the ground said surrounding sidewall and said sidewall framework being sufficiently spaced from one another to cooperatively define defining a humidifying airspace therebetween in a manner reducing rapid dry-down.

2. The bounding system according to claim 1, wherein said sufficient distance is in the range of about ½ inch to about six inches.

3. The bounding system according, to claim 2, further including:
    two or more bounding apparatus; and
    said tray top portion being configured to supportively accommodate each of said two or more bounding apparatus.

4. The bounding system according to claim 1, wherein said support tray includes a regulating system that cooperates with the surrounding sidewall to regulate the humidity in the humidifying airspace.

5. The bounding system according to claim 1, wherein said sidewall framework having a plurality of elongated rib members, spaced apart from one another, and defining said plurality of elongated, spaced sidewall apertures therebetween.

6. The bounding system according to claim 5, wherein said rib members and said sidewall apertures are generally vertically oriented.

7. The bounding system according to claim 6, wherein said rib members are relatively uniformly spaced about a longitudinal axis of said sidewall framework.

8. The bounding system according to claim 5, wherein each elongated rib member defining an interior facing surface that is convex-shaped in a transverse cross-sectional dimension thereof.

9. The bounding system according to claim 1, wherein said bounding apparatus is removably mounted to said support tray, and includes a collar member at an upper portion of said sidewall framework, said tray top portion of the support tray defining an opening therethrough for sliding axial receipt of said sidewall framework until said collar member is supportively seated atop tray top portion.

10. The bounding system according to claim 1, wherein said bounding apparatus is integrally formed with said support tray.

11. The bounding system according to claim 1, wherein said sidewall aperture area comprises at least about 60% to about 95% of said sidewall surface area.

12. The bounding system according to claim 11, wherein said bottom wall apertures are relatively uniformly spaced about said longitudinal axis, and collectively define a bottom wall aperture area that comprises at least about 60% to about 95% of said support surface area.

* * * * *